US012652271B2

(12) United States Patent
Wang et al.

(10) Patent No.: US 12,652,271 B2
(45) Date of Patent: Jun. 9, 2026

(54) METHOD AND APPARATUS FOR SECURITY COMMUNICATION

(71) Applicant: Telefonaktiebolaget LM Ericsson (publ), Stockholm (SE)

(72) Inventors: Wu Wang, Shanghai (CN); Yunjie Lu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 491 days.

(21) Appl. No.: 18/020,437

(22) PCT Filed: Aug. 10, 2021

(86) PCT No.: PCT/CN2021/111799
§ 371 (c)(1),
(2) Date: Feb. 9, 2023

(87) PCT Pub. No.: WO2022/033478
PCT Pub. Date: Feb. 17, 2022

(65) Prior Publication Data
US 2023/0370431 A1 Nov. 16, 2023

(51) Int. Cl.
*H04L 9/40* (2022.01)
*H04L 67/141* (2022.01)

(52) U.S. Cl.
CPC .......... *H04L 63/029* (2013.01); *H04L 63/083* (2013.01); *H04L 67/141* (2013.01)

(58) Field of Classification Search
CPC .................................................... H04L 63/029
See application file for complete search history.

(56) References Cited

U.S. PATENT DOCUMENTS

| | | | |
|---|---|---|---|
| 2018/0324585 A1 | 11/2018 | Nair et al. | |
| 2019/0223250 A1* | 7/2019 | Dao ...................... | H04W 72/23 |
| 2020/0007632 A1 | 1/2020 | Landais et al. | |
| 2020/0028921 A1* | 1/2020 | Cai .......................... | H04L 67/60 |
| 2020/0267520 A1* | 8/2020 | Patil ...................... | H04W 24/02 |
| 2022/0360977 A1* | 11/2022 | Kim ........................ | H04W 8/08 |

FOREIGN PATENT DOCUMENTS

| | | |
|---|---|---|
| CN | 111107047 A | 5/2020 |
| CN | 111435932 A | 7/2020 |

(Continued)

OTHER PUBLICATIONS

Examination Report for Argentinian Patent Application No. 20210102221, mailed Feb. 14, 2025, 10 pages.

(Continued)

*Primary Examiner* — Clayton R Williams
(74) *Attorney, Agent, or Firm* — Withrow & Terranova, PLLC

(57) ABSTRACT

Embodiments of the present disclosure provide methods and apparatuses for security communication. A method performed by a first session management function comprises sending a first request for getting an access token for a second session management function to a network repository function. The method further comprises receiving a first response containing the access token for the second session management function or error information from the network repository function.

13 Claims, 10 Drawing Sheets

(56) References Cited

FOREIGN PATENT DOCUMENTS

| WO | 2019158818 A1 | 8/2019 |
| WO | 2020141355 A1 | 7/2020 |

OTHER PUBLICATIONS

Author Unknown, "Technical Specification Group Services and System Aspects; System architecture for the 5G System (5GS); Stage 2 (Release 16)," Technical Specification 23.501, Version 16.5.1, Aug. 2020, 3GPP Organizational Partners, 440 pages.

Notice of Reasons for Rejection for Japanese Patent Application No. 2023-508547, mailed Jun. 18, 2024, 7 pages.

Ericsson, et al., "C4-203256: NRF Additional Authorization Parameters," 3GPP TSG-CT WG4 Meeting #98e, Jun. 2-12, 2020, Electronic Meeting, 20 pages.

Huawei, "S2-1908045: Candidate way forward option to delegated discovery," 3GPP SA WG2 Meeting #134, Jun. 24-28, 2019, Sapporo, Japan, 7 pages.

Extended European Search Report for European Patent Application No. 21855530.8, mailed Jul. 29, 2024, 11 pages.

Author Unknown, "Technical Specification Group Services and System Aspects; Security Aspects; Study on security aspects of the 5G Service Based Architecture (SBA) (Release 16)," Technical Report 33.855, Version 1.7.0, Aug. 2019, 3GPP Organizational Partners, 101 pages.

Author Unknown, "Technical Specification Group Services and System Aspects; System architecture for the 5G System (5GS); Stage 2 (Release 16)," Technical Specification 23.501, Version 16.4.0, Mar. 2020, 3GPP Organizational Partners, 430 pages.

Author Unknown, "Technical Specification Group Services and System Aspects; Procedures for the 5G System (5GS); Stage 2 (Release 16)," Technical Specification 23.502, Version 16.4.0, Mar. 2020, 3GPP Organizational Partners, 582 pages.

Author Unknown, "Technical Specification Group Core Network and Terminals; 5G System; Session Management Services; Stage 3 (Release 16)," Technical Specification 29.502, Version 16.4.0, Jul. 2020, 3GPP Organizational Partners, 256 pages.

Author Unknown, "Technical Specification Group Core Network and Terminals; 5G System; Network Function Repository Services; Stage 3 (Release 16)," Technical Specification 29.510, Version 16.4.0, Jul. 2020, 3GPP Organizational Partners, 192 pages.

Author Unknown, "Technical Specification Group Services and System Aspects; Security architecture and procedures for the 5G system (Release 16)," Technical Specification 33.501, Version 16.3.0, Jul. 2020, 3GPP Organizational Partners, 248 pages.

Hardt, "The OAuth 2.0 Authorization Framework," Request for Comments 6749, Oct. 2012, Internet Engineering Task Force, 76 pages.

Jones, et al., "JSON Web Signature (JWS)," Request for Comments 7515, May 2015, Internet Engineering Task Force, 59 pages.

Berners-Lee, et al., "Uniform Resource Identifier (URI): Generic Syntax," Request for Comments 3986, Jan. 2005, Internet Engineering Task Force, 61 pages.

Ericsson, "C4-204abc: Service Access Authorization between SMFs," 3GPP TSG-CT WG4 Meeting #99e, Aug. 18-28, 2020, Electronic Meeting, 24 pages.

International Search Report and Written Opinion for International Patent Application No. PCT/CN2021/111799, mailed Nov. 10, 2021, 9 pages.

Ericsson, et al., "CP-201045: Enhancements on CT aspects of 5GS enhanced support of vertical and LAN services," 3GPP TSG-CT Meeting #88, Jun. 28-Jul. 1, 2020, 2 pages.

First Office Action for Chinese Patent Application No. 202180056510.9, mailed Mar. 19, 2026, 31 pages.

Office Action for Colombian Patent Application No. NC2023/0001008, mailed Mar. 13, 2026, 24 pages.

* cited by examiner

500

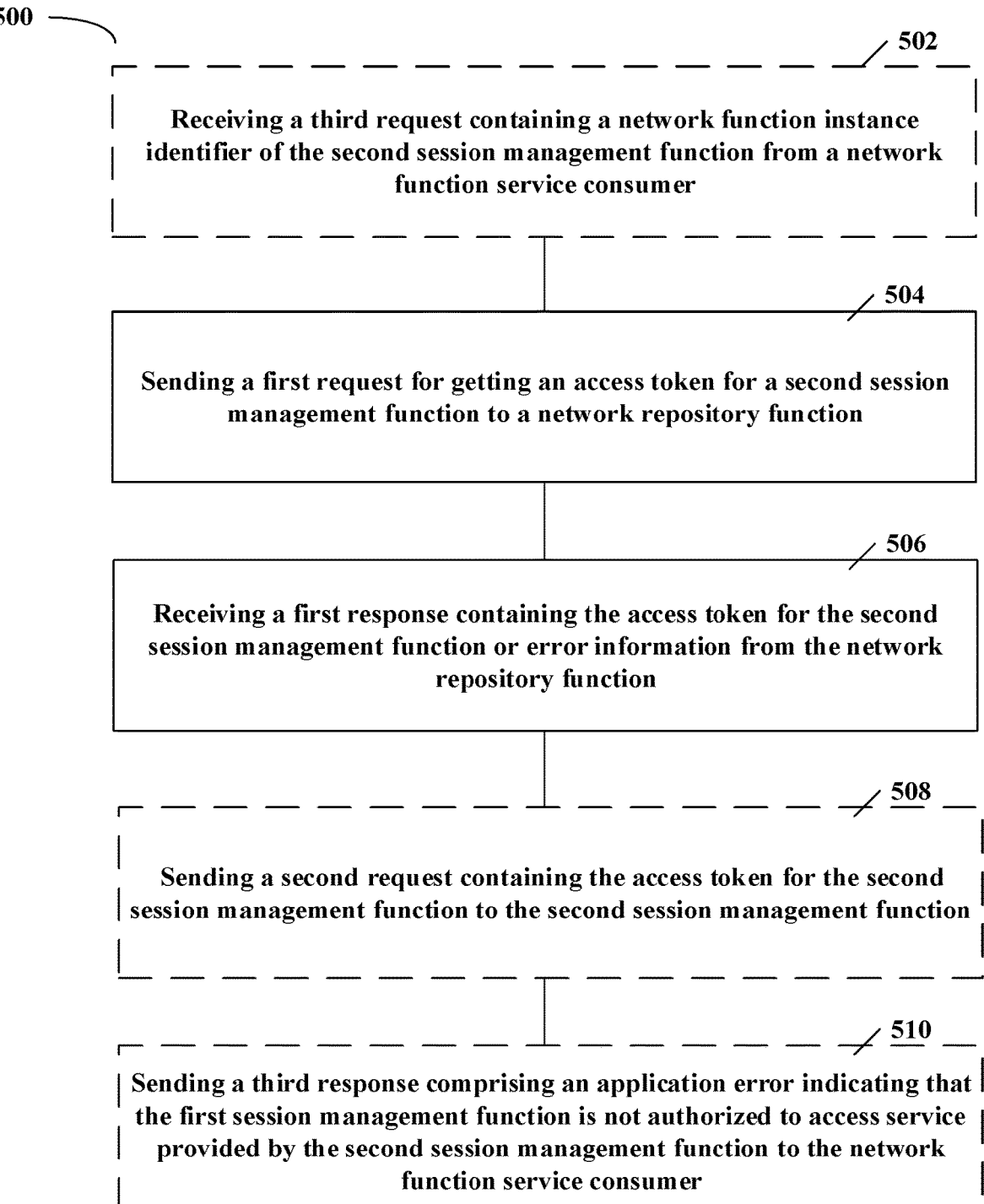

502

Receiving a third request containing a network function instance identifier of the second session management function from a network function service consumer

504

Sending a first request for getting an access token for a second session management function to a network repository function

506

Receiving a first response containing the access token for the second session management function or error information from the network repository function

508

Sending a second request containing the access token for the second session management function to the second session management function

510

Sending a third response comprising an application error indicating that the first session management function is not authorized to access service provided by the second session management function to the network function service consumer

Figures 6, 7, 8:
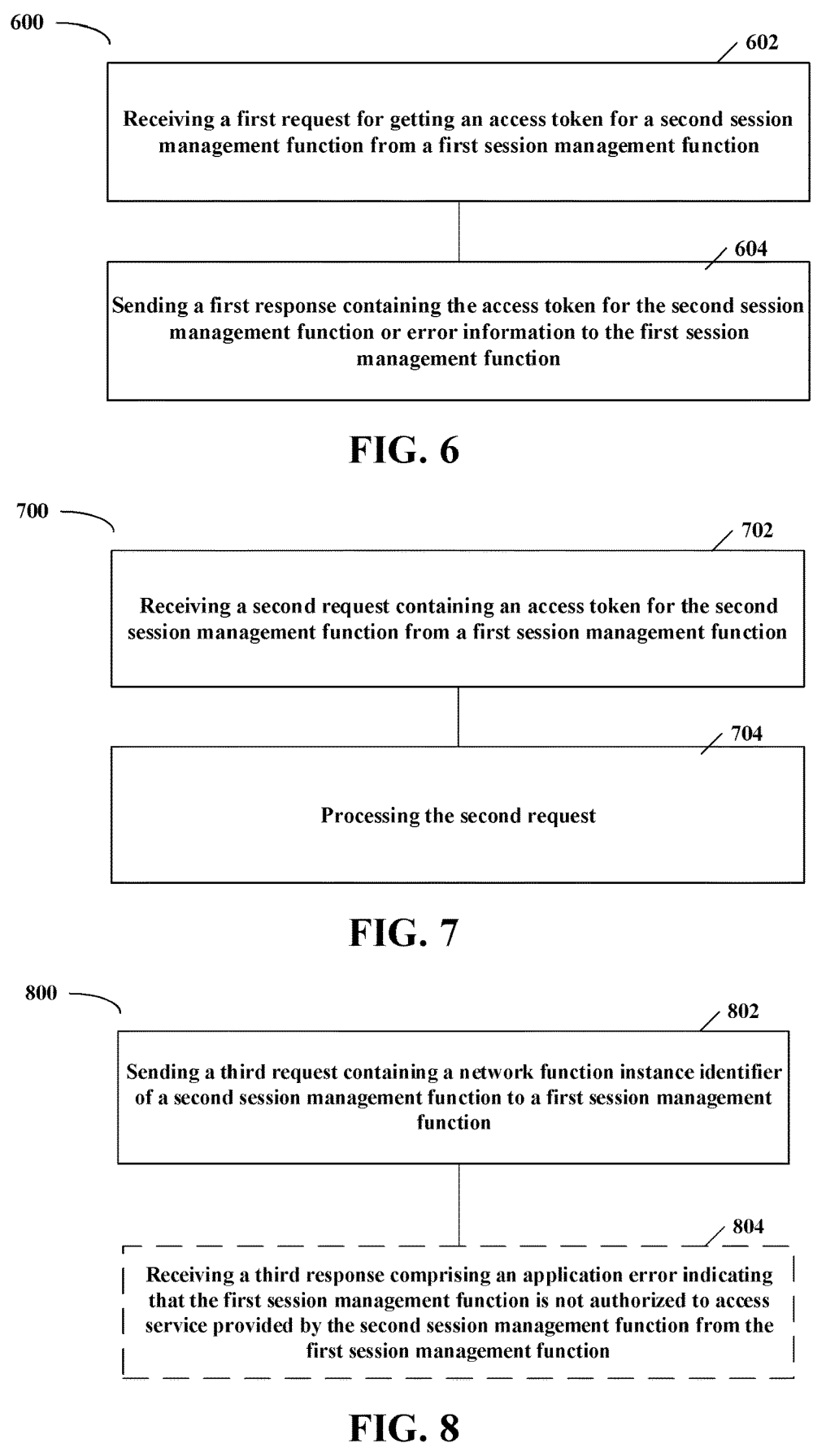

Receiving a first request for getting an access token for a second session management function from a first session management function

604

Sending a first response containing the access token for the second session management function or error information to the first session management function

Receiving a second request containing an access token for the second session management function from a first session management function

704

Processing the second request

Sending a third request containing a network function instance identifier of a second session management function to a first session management function

804

Receiving a third response comprising an application error indicating that the first session management function is not authorized to access service provided by the second session management function from the first session management function

METHOD AND APPARATUS FOR SECURITY COMMUNICATION

This application is a 35 U.S.C. § 371 national phase filing of International Application No. PCT/CN2021/111799, filed Aug. 10, 2021, which claims the benefit of International Application No. PCT/CN2020/108250, filed Aug. 10, 2020, the disclosures of which are incorporated herein by reference in their entireties.

TECHNICAL FIELD

The non-limiting and exemplary embodiments of the present disclosure generally relate to the technical field of communications, and specifically to methods and apparatuses for security communication.

BACKGROUND

This section introduces aspects that may facilitate a better understanding of the disclosure. Accordingly, the statements of this section are to be read in this light and are not to be understood as admissions about what is in the prior art or what is not in the prior art.

Deployments Topologies with Specific SMF Service Areas

In a communication network such as 3rd Generation Partnership Project (3GPP) network, a new feature "Deployment Topology with SMF Serving Area (DTSSA) is introduced in 5GC, which allows an access and mobility management function (AMF) to insert/change an intermediate session management function (I-SMF) when a user equipment (UE) moved out of serving areas of current serving session management functions (SMFs), in order to continue the protocol data unit (PDU) session(s) served by the old SMF(s).

Clause 4.23 of 3GPP TS 23.502 V16.4.0, the disclosure of which is incorporated by reference herein in its entirety, has described support of deployments topologies with specific SMF Service Areas.

FIG. 1 shows UE Triggered Service Request procedure with I-SMF insertion/change/removal. FIG. 1 is a copy of FIG. 4.23.4.3-1 of 3GPP TS 23.502 V16.4.0. the steps as shown in FIG. 1 have been described in clause 4.23.4.3 of 3GPP TS 23.502 V16.4.0. If the I-SMF has inserted or changed, the new I-SMF fetches the SM Context of the PDU session from A-SMF (anchor SMF) or old I-SMF, during UE triggered service request procedure with I-SMF/V-SMF change.

At step 4a, the new I-SMF retrieves SM (session management) Context from the old I-SMF (in the case of I-SMF change) or SMF (in the case of I-SMF insertion) by invoking Nsmf_PDUSession_Context Request (SM context type, SM Context ID (identifier)). The new I-SMF uses SM Context ID received from AMF for this service operation. SM Context ID is used by the recipient of Nsmf_PDUSession_Context Request in order to determine the targeted PDU Session. SM context type indicates that the requested information is all SM context, i.e. PDN (packet data network) Connection Context and 5G (fifth generation) SM context.

At step 4b, the old I-SMF in the case of I-SMF change or SMF in the case of I-SMF insertion responds with the SM context of the indicated PDU Session. If there is Extended Buffering is applied and the Extended Buffering timer is still running in old-SMF or old I-UPF (intermediate User plane Function (UPF), or the service request is triggered by downlink data, the old I-SMF or SMF includes a forwarding indication in the response to indicate that a forwarding tunnel is needed for sending buffered downlink packets. For I-SMF insertion, if I-UPF controlled by SMF was available for the PDU Session, the SMF includes a forwarding indication.

The similar mechanism is performed during all UE mobility procedures as described in 3GPP TS 23.502 V16.4.0, including Mobility Registration, N2/Xn based Handover, etc.

Clause 4.23.5.1 of 3GPP TS 23.502 V16.4.0 has described PDU Session establishment procedure. In DTSSA, when the PDU Session is establishment, for non roaming or LBO (Local Breakout) roaming, it includes the following cases:

If the service area of the selected SMF includes the location where the UE camps, the UE requested PDU Session Establishment procedure is same as described in clause 4.3.2.2.1 of 3GPP TS 23.502 V16.4.0.

If the service area of the selected SMF does not include the location where the UE camps, the AMF selects an I-SMF that serves the area where UE camps. The UE requested PDU Session Establishment procedure for Home-routed Roaming defined in clause 4.3.2.2.2 of 3GPP TS 23.502 V16.4.0 is used to establish the PDU Session. Compared to the procedure defined in clause 4.3.2.2.2 of 3GPP TS 23.502 V16.4.0, the V-SMF and V-UPF (visited User plane Function (UPF)) are replaced by I-SMF and I-UPF (intermediate UPF), and H-SMF (home SMF) and H-UPF (home UPF) are replaced by SMF and UPF (PSA (PDU Session Anchor)) respectively. Also only the S-NSSAI (Single Network Slice Selection Assistance Information) with the value defined by the serving PLMN (Public Land Mobile Network) is sent to the SMF. The I-SMF provides the DNAI (data network Access Identifier) list it supports to SMF and the SMF provides the DNAI(s) of interest for this PDU Session to I-SMF based on the DNAI list information received from I-SMF as defined in FIG. 4.23.9.1-1 step 1 of 3GPP TS 23.502 V16.4.0.

When the delegated discovery is used, the SCP (service communication proxy) selects the SMF as described in Annex E of 3GPP TS 23.502 V16.4.0.

FIG. 2 shows UE-requested PDU Session Establishment for home-routed roaming scenarios. FIG. 2 is a copy of FIG. 4.3.2.2.2-1 of 3GPP TS 23.502 V16.4.0. The steps of FIG. 2 have been described in clause 4.3.2.2.2 of 3GPP TS 23.502 V16.4.0.

At step 3a, as in step 3 of clause 4.3.2.2.1 of 3GPP TS 23.502 V16.4.0 with the addition that:

the AMF also provides the identity of the H-SMF it has selected in step 2 of FIG. 4.3.2.2.2-1 of 3GPP TS 23.502 V16.4.0 and both the VPLMN S-NSSAI from the Allowed NSSAI and the corresponding S-NSSAI of the HPLMN (home PLMN), which is in the mapping the VPLMN (visited PLMN) S-NSSAI from the Allowed NSSAI. The H-SMF is provided when the PDU Session is home-routed. The AMF may also provide the identity of alternative H-SMFs, if it has received in step 2 of FIG. 4.3.2.2.2-1 of 3GPP TS 23.502 V16.4.0.

The V-SMF does not use DNN Selection Mode received from the AMF but relays this information to the H-SMF.

The AMF may include the H-PCF ID in this step and V-SMF will pass it to the H-SMF in step 6. This will enable the H-SMF to select the same H-PCF in step 9a.

If Control Plane CIoT 5GS Optimisation is used for the PDU Session and the "Invoke NEF indication" in the subscription data is set for the S-NSSAI/DNN combination, the AMF includes an "Invoke NEF" flag in Nsmf_PDUSession_CreateSMContext Request.

At step 6, V-SMF to H-SMF: Nsmf_PDUSession_Create Request (SUPI (Subscription Permanent Identifier), GPSI (Generic Public Subscription Identifier) (if available), V-SMF SM Context ID, DNN (data network name), S-NS-SAI with the value defined by the HPLMN, PDU Session ID, V-SMF ID, V-CN-Tunnel-Info, PDU Session Type, PCO (Protocol Configuration Options), Number Of Packet Filters, User location information, Access Type, RAT (Radio Access Technology) Type, PCF (Policy Control Function) ID, [Small Data Rate Control Status], SM PDU DN Request Container, DNN Selection Mode, Control Plane CIoT (Cellular IoT (Internet of Things)) 5GS (fifth generation system) Optimization Indication, [Always-on PDU Session Requested], AMF ID, Serving Network). Protocol Configuration Options may contain information that H-SMF may needs to properly establish the PDU Session (e.g. SSC (Session and Service Continuity) mode or SM PDU DN Request Container to be used to authenticate the UE by the DN-AAA (authentication, authorization and accounting) as defined in clause 4.3.2.3 of 3GPP TS 23.502 V16.4.0). The H-SMF may use DNN Selection Mode when deciding whether to accept or reject the UE request. If the V-SMF does not receive any response from the H-SMF due to communication failure on the N16 interface, depending on operator policy the V-SMF may create the PDU Session to one of the alternative H-SMF(s) if additional H-SMF information is provided in step 3a, as specified in detail in 3GPP TS 29.502 V16.4.0, the disclosure of which is incorporated by reference herein in its entirety. The Small Data Rate Control Status is included if received from the AMF. The Control Plane CIoT 5GS Optimisation Indication is set by the V-SMF, if the PDU Session is intended for Control Plane CIoT 5GS Optimisation.

V-SMF SM Context ID contains the addressing information it has allocated for service operations related with this PDU Session. The H-SMF stores an association of the PDU Session and V-SMF Context ID for this PDU Session for this UE.

If the H-SMF needs to use V-SMF services for this PDU Session (invoking Nsmf_PDUSession_Update Request) before step 13, at the first invocation of Nsmf_PDUSession_Update Request the H-SMF provides the V-SMF with the H-SMF SM Context ID it has allocated for service operations related with this PDU Session.

If the RAT type was included in the message, then the H-SMF stores the RAT type in SM Context.

Nnrf_Access Token Service

In 3GPP 5GC (5G core network), OAuth is introduced to enforce the access control NF (network function) service consumer consuming services on NF service producer, i.e. the NF consumer needs to acquire an access token from authorization server (i.e. NRF (Network Repository Function)) and attached the token in service request towards the NF producer. In order to acquire the access to certain NF producer, the NF consumer provide the NF instance ID of the NF producer to the authorization server, thus the authorization server checks the NF profile of the producer and authorize the access accordingly.

The NRF offers an Nnrf_AccessToken service (used for OAuth2 authorization, see IETF RFC 6749 (October 2012), the disclosure of which is incorporated by reference herein in its entirety), following the "Client Credentials" authorization grant, as specified in 3GPP TS 33.501 V16.3.0, the disclosure of which is incorporated by reference herein in its entirety. It exposes a "Token Endpoint" where the Access Token Request service can be requested by NF Service Consumers.

FIG. 3 shows a procedure of NF service consumer obtaining access token before NF service access. FIG. 3 is a copy of FIG. 13.4.1.1-1 of 3GPP TS 33.501 V16.3.0. The steps of FIG. 3 have been described in clause 13.4.1.1 of 3GPP TS 33.501 V16.3.0.

The NF Service Consumer may send a HTTP POST request to the "Token Endpoint", as described in IETF (Internet Engineering Task Force) RFC (Request for Comment) 6749 (October 2012), clause 3.2. The "Token Endpoint" URI shall be:

{nrfApiRoot}/oauth2/token

Where {nrfApiRoot} represents the concatenation of the "scheme" and "authority" components of the NRF, as defined in IETF RFC 3986 (January 2005), the disclosure of which is incorporated by reference herein in its entirety.

The OAuth 2.0 Access Token Request includes in the body of the HTTP (Hyper Text Transfer Protocol) POST request shall contain:

An OAuth2 grant type set to "client_credentials";

The "scope" parameter indicating the names of the NF Services that the NF Service Consumer is trying to access (i.e., the expected NF service names);

The NF Instance Id of the NF Service Consumer requesting the OAuth2.0 access token, if this is an access token request for a specific NF Service Producer;

NF type of the NF Service Consumer, if this is an access token request not for a specific NF Service Producer;

NF type of the expected NF Service Producer, if this is an access token request for a specific NF Service Producer;

The NF Instance Id of the expected NF Service Producer, if this is an access token request for a specific NF Service Producer;

Home and Serving PLMN IDs, if this is an access token request for use in roaming scenarios (see clause 13.4.1.2 of 3GPP TS 33.501 V16.3.0).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems for the security communication between some NFs such as SMFs. Usually an NF consumer explicitly discovers and selects an NF producer via NRF discovery thus it is aware of the NF instance ID from the search result. But in some scenarios, the NF producer is not selected by the NF consumer itself, e.g. AMF discovers and selects H-SMF/SMF for the V-SMF/I-SMF during PDU Session establishment, or a new I-SMF retrieves SM Context from an old I-SMF or SMF. In order to successfully serve the Home Routed PDU session Establishment and UE mobility, it is required DTSSA feature to be supported in both V-SMF and I-SMF. In order to successfully access the service on the H-SMF/SMF/old I-SMF, the new I-SMF/V-SMF needs to get access token thus needs the NF instance ID of the peer SMF (as service producer). But currently AMF doesn't have a way to provide the corresponding SMF ID to the new V-SMF/I-SMF during SM Context Creation procedure.

When the V-SMF or I-SMF is inserted or changed during the UE mobility, the AMF provides the "smContextRef" that V-SMF or I-SMF can use to retrieve the SM Context from the H-AMF or A-SMF or old I-SMF, but before the V-SMF or I-SMF performs the retrieve operation, it needs to get the accessToken, otherwise the H-AMF or A-SMF or old I-SMF may reject the SM Context retrieve request. AMF does not provide the NF Instance ID of the H-AMF or A-SMF or old I-SMF that provides the "smContextRef" operation.

When the V-SMF or I-SMF is removed during the UE mobility, the AMF provides the "smContextRef" that H-AMF or A-SMF can use to retrieve the SM Context from I-SMF, but before the H-SMF or A-SMF performs the retrieve operation it needs to get the accessToken, otherwise the I-SMF may reject the SM Context retrieve request. AMF does not provide the NF Instance ID of the I-SMF that provides the "smContextRef" operation.

When the V-SMF or I-SMF is inserted during the PDU session establishment, the AMF provides the "hSmfUri" or "smfUri" that V-SMF or I-SMF can use to create PDU session to H-SMF or A-SMF, but before the V-SMF or I-SMF performs the PDU Session operation, it needs to get the accessToken, otherwise the H-SMF or A-SMF may reject the SM Context retrieve request. AMF does not provide the NF Instance ID of the H-AMF or A-SMF that provides the "hSmfUri" or "smfUri" operation.

To overcome or mitigate at least one above mentioned problems or other problems, the embodiments of the present disclosure propose an improved security communication solution.

In a first aspect of the disclosure, there is provided a method performed by a first session management function. The method comprises sending a first request for getting an access token for a second session management function to a network repository function. The method further comprises receiving a first response containing the access token for the second session management function or error information from the network repository function.

In an embodiment, the method may further comprise sending a second request containing the access token for the second session management function to the second session management function.

In an embodiment, the second request may comprise at least one of a request for establishing a forwarding tunnel between the first session management function and the second session management function; a request for retrieving session management context from the second session management function; a request for creating a new protocol data unit (PDU) session in the second session management function or creating an association with an existing packet data network (PDN) connection in the second session management function; a request for updating an established PDU session in the second session management function; a request for releasing resources associated with a PDU session in the second session management function; or a request for pushing session management context to the second session management function.

In an embodiment, the second request may comprise at least one of an Nsmf_PDUSession_UpdateSMContext Request; an Nsmf_PDUSession_Context Request; an Nsmf_PDUSession_Create Request; an Nsmf_PDUSession_Update; an Nsmf_PDUSession_Release Request; or an Nsmf_PDUSession_ContextPushRequest.

In an embodiment, the first request may be an Nnrf_AccessToken_Get request.

In an embodiment, the first request may contain a network function instance identifier of the second session management function.

In an embodiment, the network function instance identifier of the second session management function may comprise one of the network function instance identifier of a session management function hosting session management (SM) Context; the network function instance identifier of a home session management function; the network function instance identifier of a session management function; at least one network function instance identifier of at least one additional home session management function; or at least one network function instance identifier of at least one additional session management function.

In an embodiment, the error information may indicate that the first session management function is not allowed to access a service provided by a next hop network function producer.

In an embodiment, the second session management function may be a home session management function or a session management function or an old intermediate session management function or an old visited session management function.

In an embodiment, the first session management function may be a new intermediate session management function or a visited session management function.

In an embodiment, the network repository function may be an OAuth 2.0 authorization server, the first session management function is an OAuth 2.0 client and the second session management function is an OAuth 2.0 resource server.

In an embodiment, the method may further comprise receiving a third request containing a network function instance identifier of the second session management function from a network function service consumer.

In an embodiment, the method may further comprise sending a third response comprising an application error indicating that the first session management function is not authorized to access service provided by the second session management function to the network function service consumer.

In an embodiment, the network function service consumer is an access and mobility management function.

In an embodiment, the first request is sent to the network repository function when OAuth is enabled for the second session management function.

In a second aspect of the disclosure, there is provided a method performed by a network repository function. The method comprises receiving a first request for getting an access token for a second session management function from a first session management function. The method further comprises sending a first response containing the access token for the second session management function or error information to the first session management function.

In an embodiment, the access token is used by the first session management function to send a second request to the second session management function.

In an embodiment, the first request is received from the first session management function when OAuth is enabled for the second session management function.

In a third aspect of the disclosure, there is provided a method performed by a second session management function. The method comprises receiving a second request containing an access token for the second session management function from a first session management function. The method further comprises processing the second request.

In an embodiment, the method further comprise receiving a third response comprising an application error indicating that the first session management function is not authorized to access service provided by the second session management function from the first session management function.

In a fourth aspect of the disclosure, there is provided a method performed by a network function service consumer. The method comprises sending a third request containing a network function instance identifier of a second session management function to a first session management function.

In an embodiment, the network function service consumer is an access and mobility management function.

In a fifth aspect of the disclosure, there is provided a first session management function. The first session management function comprises a processor and a memory coupled to the processor. Said memory contains instructions executable by said processor. Said first session management function is operative to send a first request for get an access token for a second session management function to a network repository function. Said first session management function is further operative to receive a first response containing the access token for the second session management function or error information from the network repository function.

In a sixth aspect of the disclosure, there is provided a network repository function. The network repository function comprises a processor and a memory coupled to the processor. Said memory contains instructions executable by said processor. Said network repository function is operative to receive a first request for getting an access token for a second session management function from a first session management function. Said network repository function is further operative to send a first response containing the access token for the second session management function or error information to the first session management function.

In a seventh aspect of the disclosure, there is provided a second session management function. The second session management function comprises a processor and a memory coupled to the processor. Said memory contains instructions executable by said processor. Said second session management function is operative to receive a second request containing an access token for the second session management function from a first session management function. Said second session management function is further operative to process the second request.

In an eighth aspect of the disclosure, there is provided a network function service consumer. The network function service consumer comprises a processor and a memory coupled to the processor. Said memory contains instructions executable by said processor. Said network function service consumer is operative to send a third request containing a network function instance identifier of a second session management function to a first session management function.

In another aspect of the disclosure, there is provided a first session management function. The first session management function comprises a first sending module and a first receiving module. The first sending module may be configured to send a first request for getting an access token for a second session management function to a network repository function. The first receiving module may be configured to receive a first response containing the access token for the second session management function or error information from the network repository function.

In an embodiment, the first session management function may further comprise a second sending module. The second sending module may be configured to send a second request containing the access token for the second session management function to the second session management function. In an embodiment, the first session management function may further comprise a second receiving module. The second receiving module may be configured to receive a third request containing a network function instance identifier of the second session management function from a network function service consumer.

In an embodiment, the first session management function may further comprise a third sending module. The third sending module may be configured to send a third response comprising an application error indicating that the first session management function is not authorized to access service provided by the second session management function to the network function service consumer.

In another aspect of the disclosure, there is provided a network repository function. The network repository function comprises a receiving module and a sending module. The receiving module may be configured to receive a first request for getting an access token for a second session management function from a first session management function. The sending module may be configured to send a first response containing the access token for the second session management function or error information to the first session management function.

In another aspect of the disclosure, there is provided a second session management function. The second session management function comprises a receiving module and a processing module. The receiving module may be configured to receive a second request containing an access token for the second session management function from a first session management function. The processing module may be configured to process the second request.

In another aspect of the disclosure, there is provided a network function service consumer. The network function service consumer comprises a sending module. The sending module may be configured to send a third request containing a network function instance identifier of a second session management function to a first session management function.

In an embodiment, the network function service consumer may further comprise a receiving module. The receiving module may be configured to receive a third response comprising an application error indicating that the first session management function is not authorized to access service provided by the second session management function from the first session management function.

In another aspect of the disclosure, there is provided a computer program product, comprising instructions which, when executed on at least one processor, cause the at least one processor to carry out any of the methods according to the first, second, third and fourth aspects of the disclosure.

In another aspect of the disclosure, there is provided a computer-readable storage medium storing instructions which when executed by at least one processor, cause the at least one processor to carry out any of the methods according to the first, second, third and fourth aspects of the disclosure.

Embodiments herein afford many advantages, of which a non-exhaustive list of examples follows. Some embodiments herein may allow the first session management function to get the access token (such as OAuth2 Token) for the second session management function based on the access and mobility management function (such as AMF) provided NF instance ID, so that the first session management function can be authorized to perform various options (such as SM Context retrieve operation or PDU session create operation) on the second session management function. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 5 shows a flowchart of a method according to an embodiment of the present disclosure FIG. 6 shows a flowchart of a method according to another embodiment of the present disclosure;

FIG. 7 shows a flowchart of a method according to another embodiment of the present disclosure;

FIG. 8 shows a flowchart of a method according to another embodiment of the present disclosure;

DETAILED DESCRIPTION

Figure 1:
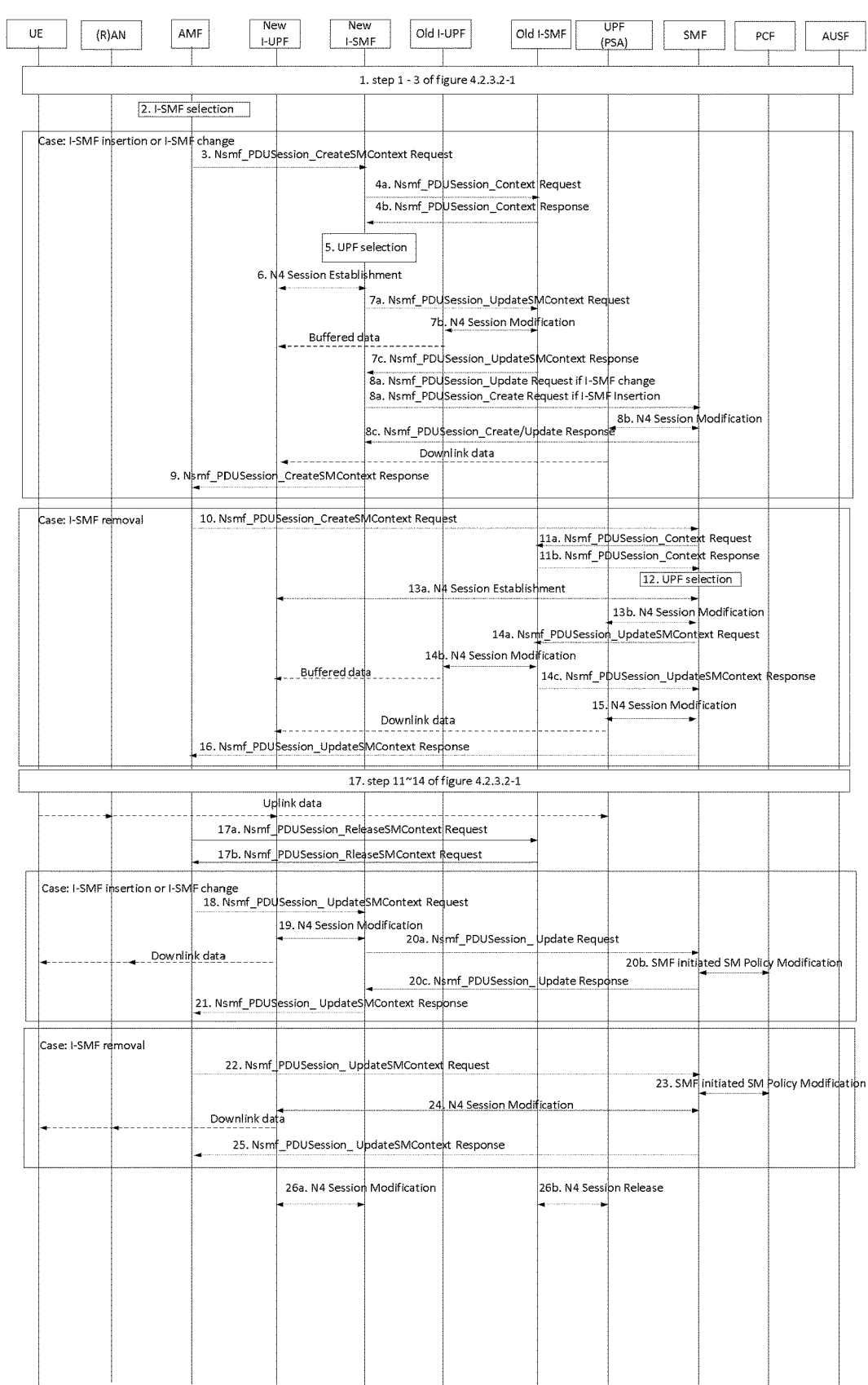
FIG. 1 shows UE Triggered Service Request procedure with I-SMF insertion/change/removal.
Figure 2:
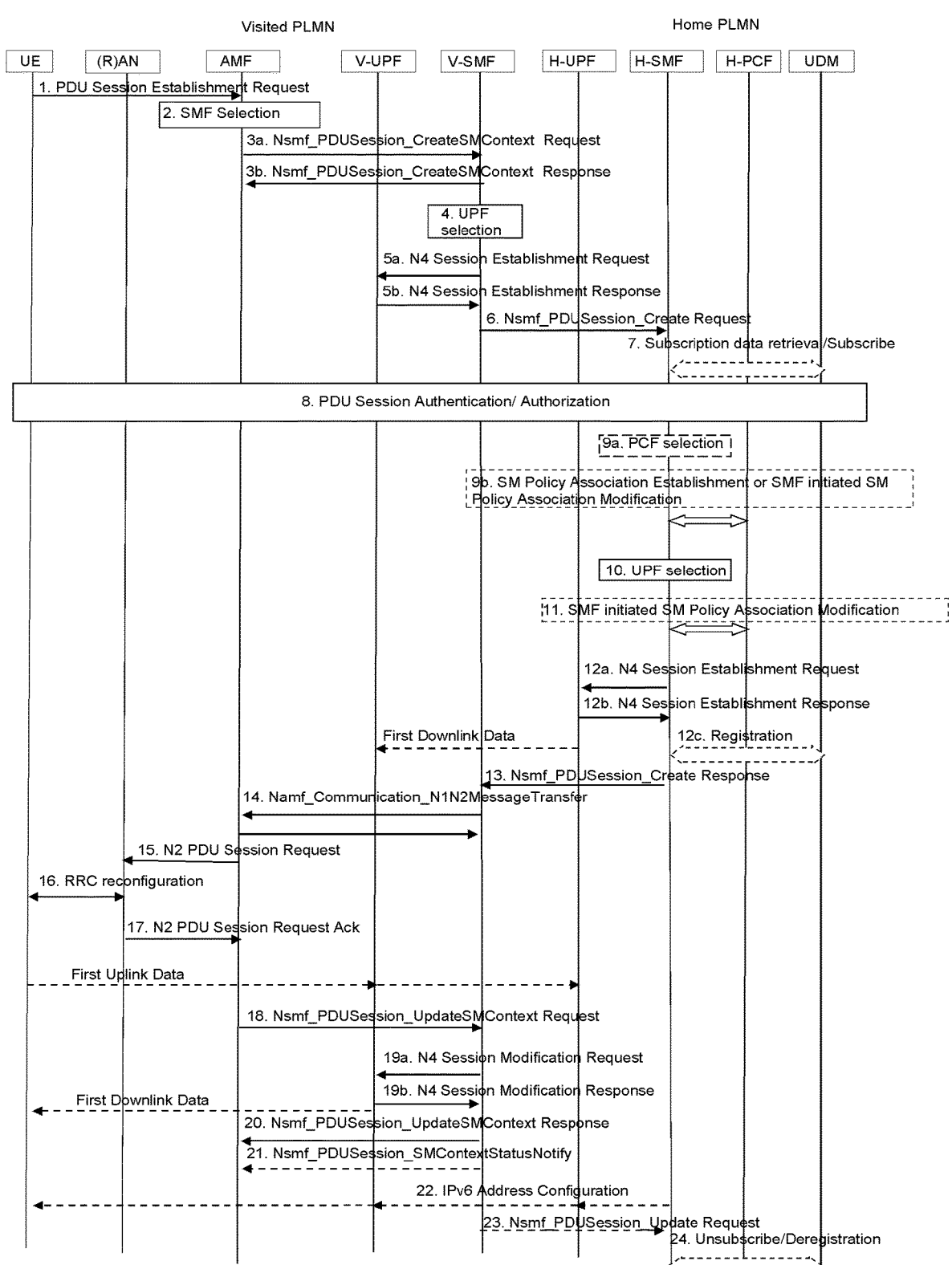
FIG. 2 shows UE-requested PDU Session Establishment for home-routed roaming scenarios.
Figure 3:
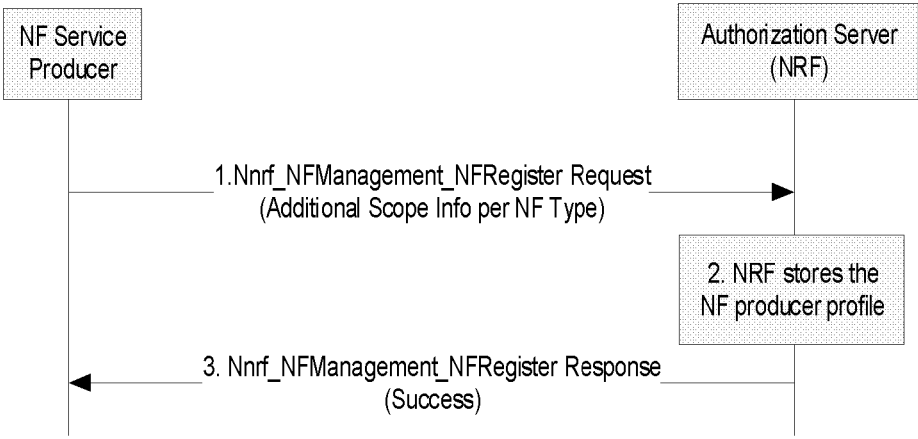
FIG. 3 shows a procedure of NF service consumer obtaining access token before NF service access.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable (wireless or wired) communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols. For example, the wireless communication protocols may comprise the first generation (1G), 2G, 3G, 4G, 4.5G, 5G communication protocols, and/or any other protocols either currently known or to be developed in the future.

The term "entity" used herein refers to a network device or network node or network function in a communication network. For example, in a wireless communication network such as a 3GPP-type cellular network, a core network device may offer numerous services to customers who are interconnected by an access network device. Each access network device is connectable to the core network device over a wired or wireless connection.

The term "network function" refers to any suitable function which can be implemented in a network entity (physical or virtual) of a communication network. For example, a network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), etc.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment", "an embodiment", "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies such as wireless sensor network may equally be utilized as long as exemplary embodiments described herein are applicable.

Figure 4:
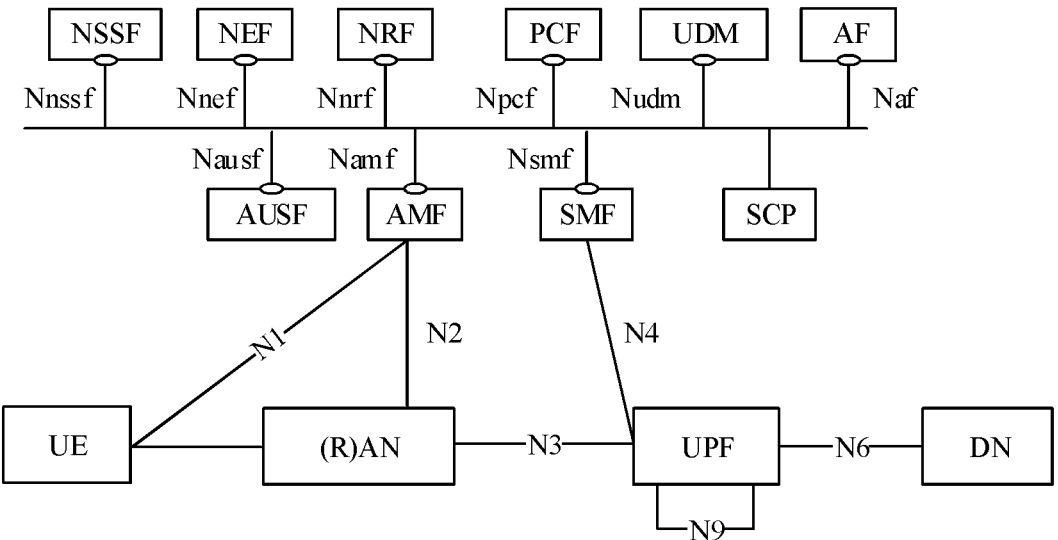
FIG. 4 schematically shows a high level architecture in a 5G network in which the embodiments of the present disclosure can be implemented.

FIG. 4 schematically shows a high level architecture in a 5G network in which the embodiments of the present disclosure can be implemented, which is same as FIG. 4.2.3-1 of 3GPP TS 23.501 V16.4.0, the disclosure of which is incorporated by reference herein in its entirety. The system architecture of FIG. 4 may comprise some exemplary elements such as AMF, SMF, AUSF, UDM, PCF, AF, NEF, UPF and NRF, (R)AN, SCP, etc. The network elements, reference points and interfaces as shown in FIG. 4 may be same as the corresponding network elements, reference points and interfaces as described in 3GPP TS 23.501 V16.4.0.

For simplicity, the system architecture of FIG. 4 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 5 shows a flowchart of a method 500 according to an embodiment of the present disclosure, which may be performed by an apparatus implemented in or at or as a first session management function (such as I-SMF, V-SMF, new SMF) or communicatively coupled to the first session management function. As such, the apparatus may provide means or modules for accomplishing various parts of the method 500 as well as means or modules for accomplishing other processes in conjunction with other components. The first session management function may provide the same or similar functionality as that of SMF as described in clause 6.2.2 of 3GPP TS 23.501 V16.4.0. In an embodiment, the first session management function may be a new intermediate session management function (such as I-SMF) or a visited session management function (such as V-SMF).

At block 502, optionally, the first session management function receives a third request containing a network function instance identifier of a second session management function from a network function service consumer. The network function service consumer may be any suitable NF (such as AMF) for example in 5GS. In an embodiment, the network function service consumer may be an access and mobility management function. The access and mobility management function may provide the same or similar functionality as that of AMF as described in clause 6.2.1 of 3GPP TS 23.501 V16.4.0. The second session management function may provide the same or similar functionality as that of SMF as described in clause 6.2.2 of 3GPP TS 23.501 V16.4.0. In an embodiment, the second session management function may be a home session management function (such as H-SMF) or a session management function (such as SMF) or an old intermediate session management function (such as I-SMF) or an old visited session management function (such as V-SMF). The third request may be any suitable request which can be sent from the network function service consumer to the first session management function, such as a modified existing request or a new message. In an embodiment, the third request may be any suitable message which can be sent from AMF to SMF as described in 3GPP TS 23.502 V16.4.0. In an embodiment, the third request may be Nsmf_PDUSession_CreateSMContext Request as described in 3GPP TS 23.502 V16.4.0. In an embodiment, the third request may contain at least one network function instance identifier of at least one second session management function.

In an embodiment, the network function instance identifier of the second session management function comprises at least one of the network function instance identifier of a session management function hosting session management (SM) Context; the network function instance identifier of a home session management function; the network function instance identifier of a session management function; at least one network function instance identifier of at least one additional home session management function; or at least one network function instance identifier of at least one additional session management function.

At block 504, the first session management function sends a first request for getting an access token for the second session management function to a network repository function. The network repository function may provide the same or similar functionality as that of NRF as described in clause 6.2.2 of 3GPP TS 23.501 V16.4.0. In an embodiment, the network repository function may be NRF. The first request may be any suitable message such as an existing message or a new message. In an embodiment, the first request may be Nnrf_AccessToken_Get request as described in clause 13.4.1.1 of 3GPP TS 33.501 V16.3.0.

In an embodiment, the first request is sent to the network repository function when OAuth is enabled for the second session management function.

In an embodiment, the first session management function may send the first request for getting at least one access token for at least one second session management function to the network repository function.

In an embodiment, the first request contains at least one network function instance identifier of at least one second session management function. The at least one network function instance identifier of the at least one second session management function may be obtained in various ways. For example, when the first session management function receives a third request containing the at least one network function instance identifier of the at least one second session management function from a network function service consumer, and then it may obtain the at least one network function instance identifier of the at least one second session management function.

At block 506, the first session management function receives a first response containing the access token for the second session management function or error information from the network repository function. The first response may be any suitable message such as an existing message or a new message. In an embodiment, the first response may be Nnrf_AccessToken_Get response as described in clause 13.4.1.1 of 3GPP TS 33.501 V16.3.0.

In an embodiment, the first response may contain at least one access token for at least one second session management function.

The error information may be any suitable error information. For example, the error information may be OAuth 2.0 error response defined in RFC 6749. In an embodiment, the error information indicates that the first session management function is not allowed to access a service provided by a next hop network function producer (e.g., the second session management function).

For example, the NF service consumer (e.g., the first session management function) shall request an access token from the network repository function (e.g., NRF) in the same PLMN using the Nnrf_AccessToken_Get request operation. The message shall include the NF Instance Id(s) of the NF service consumer, the requested "scope" including the expected NF service name(s) and optionally "additional scope" information (i.e. requested resources and requested actions (service operations) on the resources), NF type of the expected NF producer instance and NF consumer. The service consumer may also include a list of NSSAIs or list of NSI (Network Slice Instance) IDs for the expected NF producer instances (e.g., the second session management function). The message may include the NF Set ID of the expected NF service producer instances. The NRF may optionally authorize the NF service consumer. It shall then generate an access token with appropriate claims included. The NRF shall digitally sign the generated access token based on a shared secret or private key as described in RFC 7515. The claims in the token shall include the NF Instance Id of NRF (issuer), NF Instance Id of the NF Service consumer (subject), NF type of the NF Service producer (audience), expected service name(s), scope (scope), expiration time (expiration) and optionally "additional scope" information (allowed resources and allowed actions (service operations) on the resources). The claims may include a list of NSSAIs or NSI IDs for the expected NF producer instances. The claims may include the NF Set ID of the expected NF service producer instances. If the authorization is successful, the NRF shall send access token to the NF service consumer in the Nnrf_AccessToken_Get response operation, otherwise it shall reply based on OAuth 2.0 error response defined in RFC 6749. The other parameters (e.g., the expiration time, allowed scope) sent by NRF in addition to the access token are described in 3GPP TS 29.510 V16.4.0. The NF service consumer may store the received token(s). Stored tokens may be re-used for accessing service(s) from producer NF type listed in claims (scope, audience) during their validity time.

In an embodiment, the network repository function is an OAuth 2.0 authorization server, the first session management function is an OAuth 2.0 client and the second session management function is an OAuth 2.0 resource server.

At block 508, optionally, the first session management function sends a second request containing the access token for the second session management function to the second session management function. The second request may be any suitable request which can be sent from the first session management function to the second session management function, such as a modified existing request or a new message. In an embodiment, the second request may be any suitable message which can be sent from a SMF to another SMF as described in 3GPP TS 23.502 V16.4.0.

In an embodiment, the second request may comprise at least one of a request for establishing a forwarding tunnel between the first session management function and the second session management function; a request for retrieving session management context from the second session management function; a request for creating a new protocol data unit (PDU) session in the second session management function or creating an association with an existing packet data network (PDN) connection in the second session management function; a request for updating an established PDU session in the second session management function; a request for releasing resources associated with a PDU session in the second session management function; or a request for pushing session management context to the second session management function.

In an embodiment, the second request comprises at least one of an Nsmf_PDUSession_UpdateSMContext Request; an Nsmf_PDUSession_Context Request; an Nsmf_PDUSession_Create Request; an Nsmf_PDUSession_Update; an Nsmf_PDUSession_Release Request; or an Nsmf_PDUSession_ContextPushRequest as described in 3GPP TS 23.502 V16.4.0.

At block 510, optionally, the first session management function may send a third response comprising an application error indicating that the first session management function is not authorized to access service provided by the second session management function to the network function service consumer.

FIG. 6 shows a flowchart of a method 600 according to another embodiment of the present disclosure, which may be performed by an apparatus implemented in or at or as a network repository function (such as NRF) or communicatively coupled to the network repository function. As such, the apparatus may provide means or modules for accomplishing various parts of the method 600 as well as means or modules for accomplishing other processes in conjunction with other components. For some parts which have been described in the above embodiments, detailed description thereof is omitted here for brevity.

At block 602, the network repository function receives a first request for getting an access token for a second session management function from a first session management function. For example, the first session management function may send the first request at block 502 of FIG. 5, and then the network repository function may receive the first request. In an embodiment, the first request is received from the first session management function when OAuth is enabled for the second session management function.

The network repository function such as NRF may optionally authorize the NF service consumer (i.e., the first session management function). It shall then generate an access token with appropriate claims included. The NRF shall digitally sign the generated access token based on a shared secret or private key as described in RFC 7515. The claims in the token shall include the NF Instance Id of NRF (issuer), NF Instance Id of the NF Service consumer (subject), NF type of the NF Service producer (audience), expected service name(s), scope (scope), expiration time (expiration) and optionally "additional scope" information (allowed resources and allowed actions (service operations) on the resources). The claims may include a list of NSSAIs or NSI IDs for the expected NF producer instances. The claims may include the NF Set ID of the expected NF service producer instances.

At block 604, the network repository function sends a first response containing the access token for the second session management function or error information to the first session management function.

In an embodiment, the access token is used by the first session management function to send a second request to the second session management function as described above.

FIG. 7 shows a flowchart of a method 700 according to another embodiment of the present disclosure, which may be performed by an apparatus implemented in or at or as a second session management function (such as SMF) or communicatively coupled to the second session management function. As such, the apparatus may provide means or modules for accomplishing various parts of the method 700 as well as means or modules for accomplishing other processes in conjunction with other components. For some parts which have been described in the above embodiments, detailed description thereof is omitted here for brevity.

At block 702, the second session management function receives a second request containing an access token for the second session management function from a first session management function. For example, the first session management function may send the second request at block 508 of FIG. 5, and then the second session management function may receive the second request.

At block 704, the second session management function processes the second request. For example, depending on the specific type of the second request, the second session management function may differently process the second request. For example, when the second request comprises at least one of an Nsmf_PDUSession_UpdateSMContext Request; an Nsmf_PDUSession_Context Request; an Nsmf_PDUSession_Create Request; an Nsmf_PDUSession_Update; an Nsmf_PDUSession_Release Request; or an Nsmf_PDUSession_ContextPushRequest, the second session management function may process the second request as described in 3GPP TS 23.502 V16.4.0.

FIG. 8 shows a flowchart of a method 800 according to another embodiment of the present disclosure, which may be performed by an apparatus implemented in or at or as a network function service consumer (such as AMF) or communicatively coupled to the network function service consumer. As such, the apparatus may provide means or modules for accomplishing various parts of the method 800 as well as means or modules for accomplishing other processes in conjunction with other components. For some parts which have been described in the above embodiments, detailed description thereof is omitted here for brevity.

At block 802, the network function service consumer sends a third request containing a network function instance identifier of a second session management function to a first session management function. The third request may be any suitable message such as a modified existing message or a new message. In an embodiment, the third message may be an Nsmf_PDUSession_CreateSMContext Request as described in 3GPP TS 23.502 V16.4.0.

At block 804, optionally, the network function service consumer receives a third response comprising an application error indicating that the first session management function is not authorized to access service provided by the second session management function from the first session management function.

In an embodiment, the network function service consumer may be an access and mobility management function such as AMF.

Figure 9:
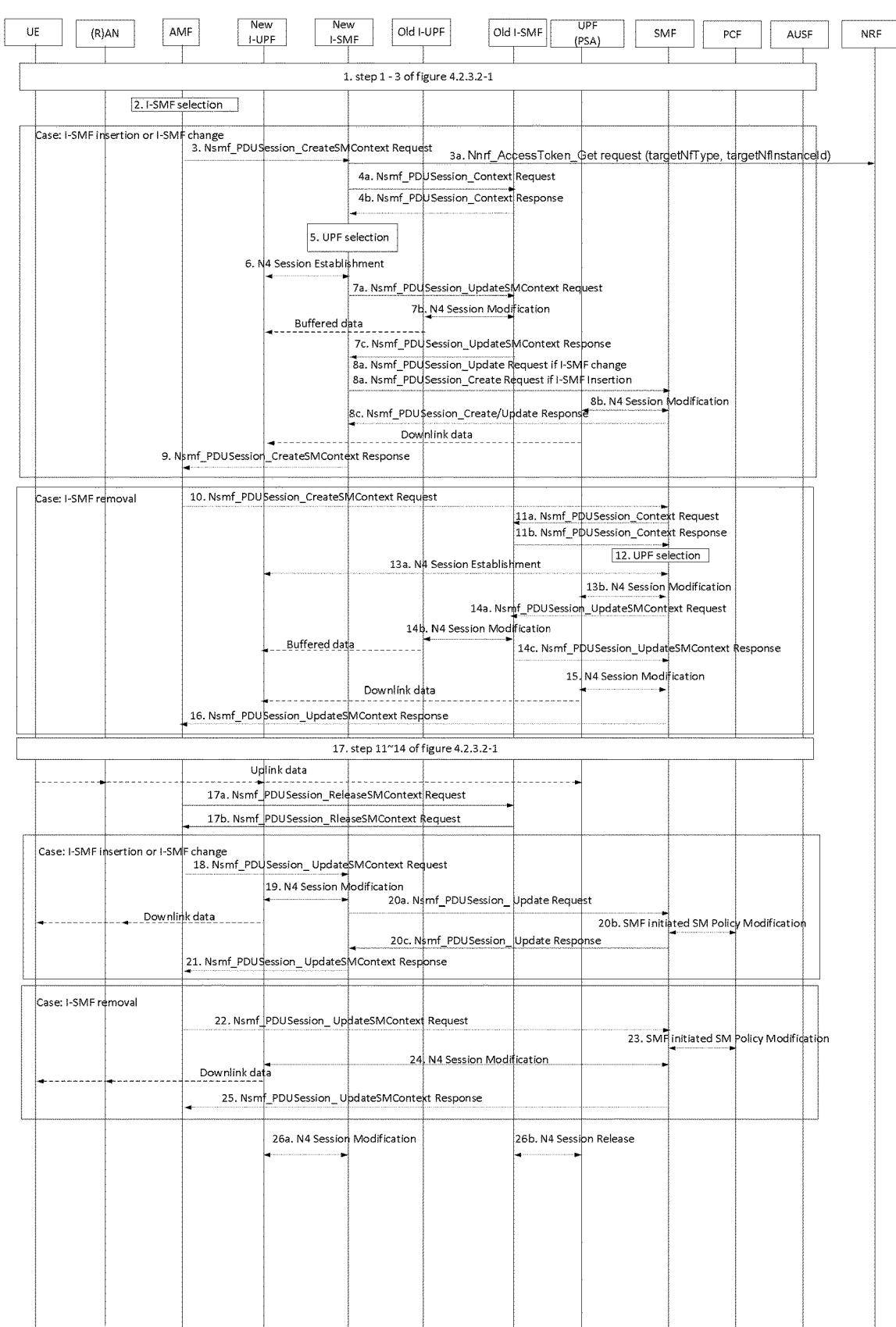
FIG. 9 shows a flowchart of UE Triggered Service Request with I-SMF insertion/change/removal according to an embodiment of the present disclosure.

FIG. 9 shows a flowchart of UE Triggered Service Request with I-SMF insertion/change/removal according to an embodiment of the present disclosure.

When, as part of a UE Triggered Service Request, I-SMF is to be inserted, changed or removed, the procedure in this clause is used. It includes the following cases:

the UE moves from SMF service area to new I-SMF service area, a new I-SMF is inserted (i.e. I-SMF insertion); or the UE moves from old I-SMF service area to new I-SMF service area, the I-SMF is changed (i.e. I-SMF change); or the UE moves from old I-SMF service area to SMF service area, the old I-SMF is removed (i.e. I-SMF removal).

If the service request is triggered by network due to downlink data and a new I-UPF is selected, forwarding tunnel is established between the old I-UPF (if the old I-UPF is different from PSA) and the new I-UPF to forward buffered data.

For Home Routed Roaming case, the I-SMF (old and new) and I-UPF (old and new) are located in Visted PLMN, while the SMF and UPF (PSA) are located in the Home PLMN. In this HR roaming case only the case of I-SMF change applies (there is always a V-SMF for the PDU Session).

At step 3, if the AMF has selected a new I-SMF, the AMF sends an Nsmf_PDUSession_CreateSMContext Request (PDU Session ID, SM Context ID, UE location info, Access Type, RAT Type, Operation Type) to the new I-SMF. The SM Context ID points to the old I-SMF in the case of I-SMF change or to SMF in the case of I-SMF insertion.

The AMF set the Operation Type to "UP activate" to indicate establishment of N3 tunnel User Plane resources for the PDU Session(s). The AMF determines Access Type and RAT Type based on the Global RAN Node ID associated with the N2 interface.

If the UE Time Zone has changed compared to the last reported UE Time Zone then the AMF shall include the UE Time Zone IE in this message.

In an embodiment, AMF provides the NF Instance ID of the SMF corresponding to the "SmContextRef". For example, the Nsmf_PDUSession_CreateSMContext Request may further comprise the NF Instance ID of the SMF corresponding to the "SmContextRef".

In an embodiment, AMF provide the NF instance ID of the SMF corresponding to the "smfUri" or "hSmfUri". For example, the Nsmf_PDUSession_CreateSMContext Request may further comprise the NF Instance ID of the SMF corresponding to the "smfUri" or "hSmfUri".

At step 3a, the new I-SMF invoke the Nnrf_AccessToken_Get request (targetNfType, targetNfInstanceId) to NRF to get the access token for the old I-SMF (in case of I-SMF change) or SMF (in the case of I-SMF insertion).

At step 4a, the new I-SMF retrieves SM Context from the old I-SMF (in the case of I-SMF change) or SMF (in the case of I-SMF insertion) by invoking Nsmf_PDUSession_Context Request (SM context type, SM Context ID). The new I-SMF uses SM Context ID received from AMF for this service operation. SM Context ID is used by the recipient of Nsmf_PDUSession_Context Request in order to determine the targeted PDU Session. SM context type indicates that the requested information is all SM context, i.e. PDN Connection Context and 5G SM context.

In an embodiment, the Nsmf_PDUSession_Context Request may further comprise the access token for the old I-SMF (in case of I-SMF change) or SMF (in the case of I-SMF insertion).

At step 7a, if the tunnel endpoints for the buffered DL data were allocated, the new I-SMF invokes Nsmf_PDUSession_UpdateSMContext Request (tunnel endpoints for buffered DL data) to the old I-SMF in the case of I-SMF change in order to establish the forwarding tunnel. The new I-SMF uses the SM Context ID received from AMF for this service operation.

In an embodiment, the Nsmf_PDUSession_UpdateSMContext Request may further comprise the access token for the old I-SMF.

The other steps of FIG. 9 are same as the corresponding steps of FIG. 4.23.4.3-1 of 3GPP TS 23.502 V16.4.0. The messages except the Nnrf_AccessToken_Get request as shown in FIG. 9 are same as the corresponding message of FIG. 4.23.4.3-1 of 3GPP TS 23.502 V16.4.0.

In an embodiment, the similar mechanism of FIG. 9 may be performed during all UE mobility procedures as described in 3GPP TS 23.502 V16.4.0, including Mobility Registration, N2/Xn based Handover, etc.

Figure 10:
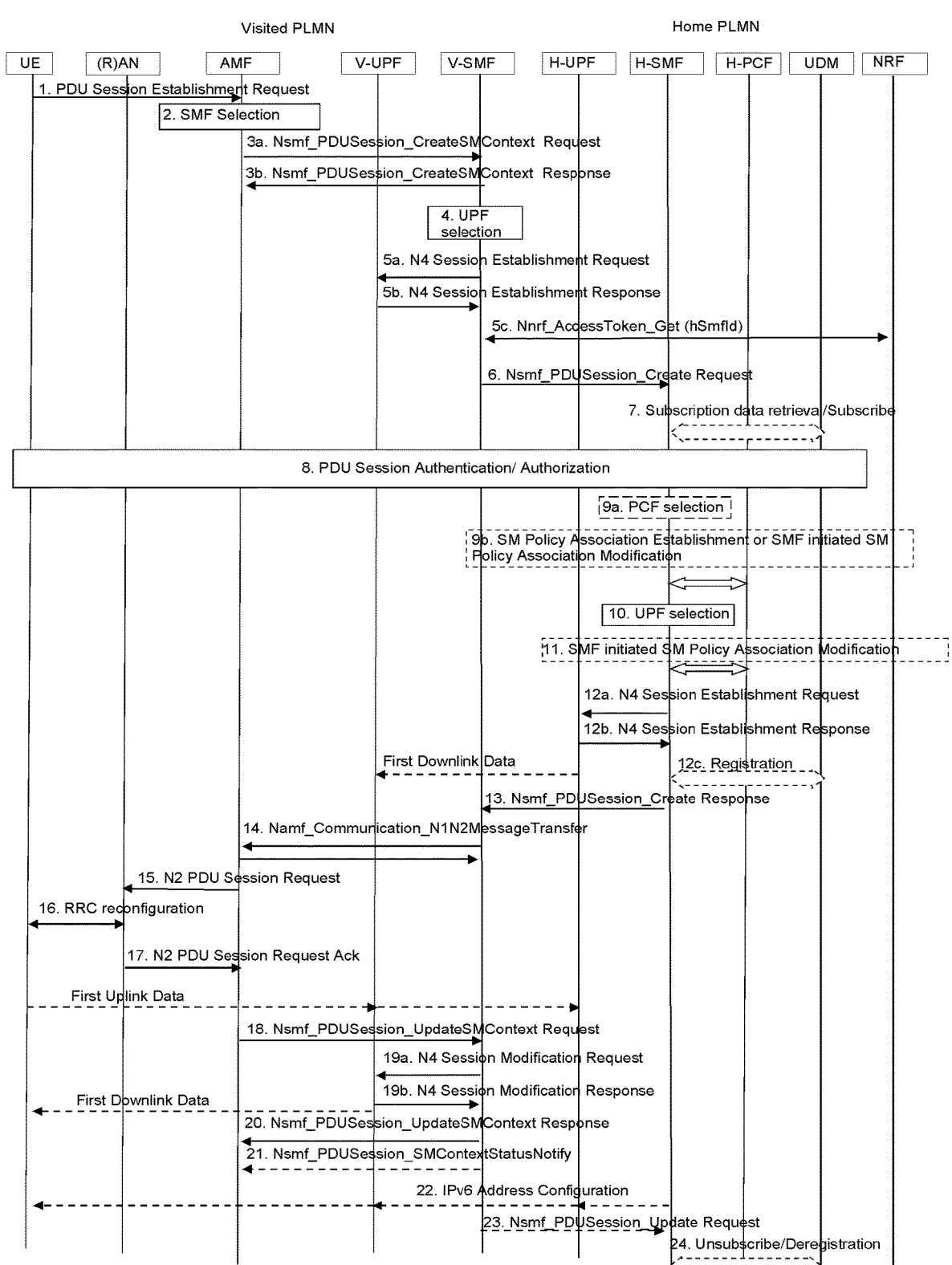
FIG. 10 shows a flowchart of UE-requested PDU Session Establishment for home-routed roaming scenarios according to an embodiment of the present disclosure.

FIG. 10 shows a flowchart of UE-requested PDU Session Establishment for home-routed roaming scenarios according to an embodiment of the present disclosure.

At step 3a, as in step 3 of clause 4.3.2.2.1 of 3GPP TS 23.502 V16.4.0 with the addition that:

the AMF also provides the identity of the H-SMF it has selected in step 2 of FIG. 10 and both the VPLMN S-NSSAI from the Allowed NSSAI and the corresponding S-NSSAI of the HPLMN, which is in the mapping the VPLMN S-NSSAI from the Allowed NSSAI. The H-SMF is provided when the PDU Session is home-routed. The AMF may also provide the identity of alternative H-SMFs, if it has received in step 2 of FIG. 10.

The V-SMF does not use DNN Selection Mode received from the AMF but relays this information to the H-SMF.

The AMF may include the H-PCF ID in this step and V-SMF will pass it to the H-SMF in step 6. This will enable the H-SMF to select the same H-PCF in step 9a of FIG. 10.

If Control Plane CIoT 5GS Optimisation is used for the PDU Session and the "Invoke NEF indication" in the subscription data is set for the S-NSSAI/DNN combination, the AMF includes an "Invoke NEF" flag in Nsmf_PDUSession_CreateSMContext Request.

In an embodiment, AMF provides the NF Instance ID of the SMF corresponding to the "SmContextRef". For example, the Nsmf_PDUSession_CreateSMContext Request may further comprise the NF Instance ID of the SMF corresponding to the "SmContextRef".

In an embodiment, AMF provide the NF instance ID of the SMF corresponding to the "smfUri" or "hSmfUri". For example, the Nsmf_PDUSession_CreateSMContext Request may further comprise the NF Instance ID of the SMF corresponding to the "smfUri" or "hSmfUri".

At step 5, the V-SMF initiates an N4 Session Establishment procedure with the selected V-UPF:

At step 5a, the V-SMF sends an N4 Session Establishment Request to the V-UPF.

At step 5b, the V-UPF acknowledges by sending an N4 Session Establishment Response. The CN Tunnel Info is provided to V-SMF in this step.

At step 5c, the V-SMF invoke the Nnrf_AccessToken_Get request (targetNfType, targetNfInstanceId) to NRF to get the access token for the H-SMF.

At step 6, V-SMF to H-SMF: Nsmf_PDUSession_Create Request (SUPI, GPSI (if available), V-SMF SM Context ID, DNN, S-NSSAI with the value defined by the HPLMN, PDU Session ID, V-SMF ID, V-CN-Tunnel-Info, PDU Session Type, PCO, Number Of Packet Filters, User location information, Access Type, RAT Type, PCF ID, [Small Data Rate Control Status], SM PDU DN Request Container, DNN Selection Mode, Control Plane CIoT 5GS Optimisation Indication, [Always-on PDU Session Requested], AMF ID, Serving Network). Protocol Configuration Options may contain information that H-SMF may needs to properly establish the PDU Session (e.g. SSC mode or SM PDU DN Request Container to be used to authenticate the UE by the DN-AAA as defined in clause 4.3.2.3). The H-SMF may use DNN Selection Mode when deciding whether to accept or reject the UE request. If the V-SMF does not receive any response from the H-SMF due to communication failure on the N16 interface, depending on operator policy the V-SMF may create the PDU Session to one of the alternative H-SMF(s) if additional H-SMF information is provided in step 3a, as specified in detail in 3GPP TS 29.502 V16.4.0. The Small Data Rate Control Status is included if received from the AMF. The Control Plane CIoT 5GS Optimisation Indication is set by the V-SMF, if the PDU Session is intended for Control Plane CIoT 5GS Optimisation.

V-SMF SM Context ID contains the addressing information it has allocated for service operations related with this PDU Session. The H-SMF stores an association of the PDU Session and V-SMF Context ID for this PDU Session for this UE.

If the H-SMF needs to use V-SMF services for this PDU Session (invoking Nsmf_PDUSession_Update Request) before step 13, at the first invocation of Nsmf_PDUSession_Update Request the H-SMF provides the V-SMF with the H-SMF SM Context ID it has allocated for service operations related with this PDU Session.

If the RAT type was included in the message, then the H-SMF stores the RAT type in SM Context.

In an embodiment, the Nsmf_PDUSession_Create Request may further comprise the access token for the H-SMF.

The other steps of FIG. 10 are same as the corresponding steps of FIG. 4.3.2.2.2-1 of 3GPP TS 23.502 V16.4.0. The messages except the Nnrf_AccessToken_Get request as shown in FIG. 10 are same as the corresponding message of FIG. 4.3.2.2.2-1 of 3GPP TS 23.502 V16.4.0.

In an embodiment, 3GPP TS 29.502 V16.4.0 may be changed as following.

| * * * First Change * * * * |
| --- |

5.2.2.2.1    General

The Create SM Context service operation shall be used to create an individual SM context, for a given PDU session, in the SMF, in the V-SMF for HR roaming scenarios, or in the I-SMF for a PDU session with an I-SMF.

It is used in the following procedures:

- UE requested PDU Session Establishment (see clauses 4.3.2 and 4.23.5.1 of 3GPP TS 23.502 [3]);

- EPS to 5GS Idle mode mobility, EPS to 5GS Idle mode mobility with data forwarding or handover using N26 interface (see clauses 4.11.1, 4.23.12.3, 4.23.12.5 and 4.23.12.7 of 3GPP TS 23.502 [3]);

- EPS to 5GS mobility without N26 interface (see clause 4.11.2.3 3GPP TS 23.502 [3]);

- Handover of a PDU session between 3GPP access and non-3GPP access, when the target AMF does not know the SMF resource identifier of the SM context used by the source AMF, e.g. when the target AMF is not in the PLMN of the N3IWF (see clause 4.9.2.3.2 of 3GPP TS 23.502 [3]), or when the UE is roaming and the selected N3IWF is in the HPLMN (see clause 4.9.2.4.2 of 3GPP TS 23.502 [3]);

- Handover from EPS to 5GC-N3IWF (see clause 4.11.3.1 of 3GPP TS 23.502 [3]);

- Handover from EPC/ePDG to 5GS (see clause 4.11.4.1 of 3GPP TS 23.502 [3]);

- Xn based or N2 based handover with I-SMF or V-SMF insertion and change (see clauses 4.23.7.3, 4.23.11 and 4.23.12 of 3GPP TS 23.502 [3]);

- UE Triggered Service Request with I-SMF insertion/change/removal or V-SMF change (see clause 4.23.4.3 of 3GPP TS 23.502 [3]);

- Registration procedure for a UE with a PDU session with I-SMF or V-SMF insertion, change and removal (see clause 4.23.3 of 3GPP TS 23.502 [3]);

- Handover from EPC/ePDG to 5GS with I-SMF insertion (see clause 4.23 of 3GPP TS 23.502 [3]);

- SMF Context Transfer procedure, LBO or no Roaming, no I-SMF (see clause 4.26.5.3 of 3GPP TS 23.502 [3]);

- I-SMF Context Transfer procedure (see clause 4.26.5.2 of 3GPP TS 23.502 [3]);

- 5G-RG requested PDU Session Establishment via W-5GAN (see clause 7.3.1 of 3GPP TS 23.316 [36]);

- FN-RG related PDU Session Establishment via W-5GAN (see clause 7.3.4 of 3GPP TS 23.316 [36]);

- Non-5G capable device behind 5G-CRG and FN-CRG requested PDU Session Establishment via W-5GAN (see clause 4.10a of 3GPP TS 23.316 [36]);

- Handover from 3GPP access/EPS to W-5GAN/5GC (see clause 7.6.4.1 of 3GPP TS 23.316 [36]).

Figure 11:
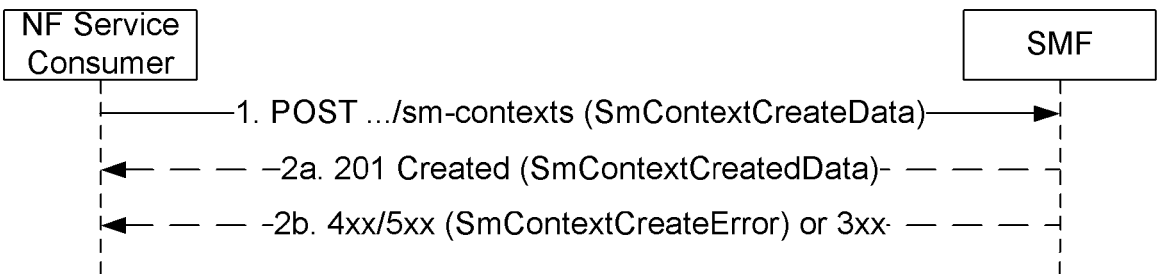
FIG. 11 shows a flowchart of SM context creation according to an embodiment of the disclosure.

There shall be only one individual SM context per PDU session.
The NF Service Consumer (e.g. AMF) shall create an SM context by using the HTTP POST method as shown in FIG.11. FIG.11 shows a flowchart of SM context creation according to an embodiment of the disclosure.

1. The NF Service Consumer shall send a POST request to the resource representing the SM contexts collection resource of the SMF. The payload body of the POST request shall contain:

- a representation of the individual SM context resource to be created;

- the Request Type IE, if it is received from the UE for a single access PDU session and if the request refers to an existing PDU session or an existing Emergency PDU session; the Request Type IE shall not be included for a MA-PDU session establishment request; it may be included otherwise;

- the Old PDU Session ID, if it is received from the UE (i.e. for a PDU session establishment for the SSC mode 3 operation);

- the indication that the UE is inside or outside of the LADN (Local Area Data Network) service area, if the DNN corresponds to a LADN;

- the indication that a MA-PDU session is requested if a MA-PDU session is requested to be established by the UE, or the indication that the PDU session is allowed to be upgraded to a MA-PDU session if so indicated by the UE;

- the anType;

- the additionalAnType, if the UE is registered over both 3GPP and Non-3GPP accesses;

- the cpCiotEnabled IE with the value "True", if the NF service consumer (e.g. the AMF) has verified that the CIOT feature is supported by the SMF (and for a home-routed session, that it is also supported by the H-SMF), and Control Plane CIoT 5GS Optimisation is enabled for this PDU session;

- the cpOnlyInd IE with the value "True", if the PDU session shall only use Control Plane CIoT 5GS Optimisation;

- the Invoke NEF indication with the value "True" for a home-routed PDU session, if the cpCiotEnabled IE is set to "True" and data delivery via NEF is selected for the PDU session;

- a subscription for SM context status notification;

- the servingNfId identifying the serving AMF;

- trace control and configuration parameters, if trace is to be activated (see 3GPP TS 32.422 [22]);

- identifiers (i.e. FQDN or IP address) of N3 terminations at the W-AGF, TNGF or TWIF, if available;

- a subscription for DDN failure notification, if the Availability after DDN failure event is subscribed by the UDM.

For the UE requested PDU Session Establishment procedure in home routed roaming scenario (see clause 4.3.2.2.2 of 3GPP TS 23.502 [3]), the NF Service Consumer shall provide the URI of the Nsmf_PDUSession service of the H-SMF in the hSmfUri IE and optionally the corresponding SMF ID, and may provide the URI of the Nsmf_PDUSession service of additional H-SMF(s) with the corresponding SMF ID(s). The V-SMF shall try to create the PDU session using the hSmfUri IE. If due to communication failure on the N16 interface the V-SMF does not receive any response from the H-SMF, then:

- depending on operator policy, the V-SMF may try reaching the hSmfUri via an alternate path; or

- if additional H-SMF URI is provided, the V-SMF may try to create the PDU session on one of the additional H-SMF(s) provided.

For a PDU session establishment with an I-SMF (see clause 4.23.5.1 of of 3GPP TS 23.502 [3]), the NF Service Consumer shall provide the URI of the Nsmf_PDUSession service of the SMF in the smfUri IE and optionally the corresponding SMF ID, and may provide the URI of the Nsmf_PDUSession service of additional SMF(s) with the corresponding SMF ID(s). The I-SMF shall try to create the PDU session using the smfUri IE. If due to communication failure on the N16a interface the I-SMF does not receive any response from the SMF, then:

- depending on operator policy, the I-SMF may try reaching the smfUri via an alternate path; or

- if additional SMF URI is provided, the I-SMF may try to create the PDU session on one of the additional SMF(s) provided.

For the UE requested PDU Session Establishment procedure, if the AMF determines that the RAT type is NB-IoT and the UE has already 2 PDU Sessions with user plane resources activated, the AMF may continue with the PDU Session establishment and include the cpCiotEnabled IE or cpOnlyInd IE with the value "True" to the SMF as specified in clause 4.3.2.2.1 of 3GPP TS 23.502 [3].

The payload body of the POST request may further contain:

- the name of the AMF service to which SM context status notification are to be sent (see clause 6.5.2.2 of 3GPP TS 29.500 [4]), encoded in the serviceName attribute.

2a. On success, "201 Created" shall be returned, the payload body of the POST response shall contain the representation describing the status of the request and the "Location" header shall be present and shall contain the URI of the created resource. The authority and/or deployment-specific string of the apiRoot of the created resource URI may differ from the authority and/or deployment-specific string of the apiRoot of the request URI received in the POST request.

If the Request Type was received in the request and set to EXISTING_PDU_SESSION or EXISTING_EMERGENCY_PDU_SESSION (i.e. indicating that this is a request for an existing PDU session or an existing emergency PDU session), the SMF shall identify the existing PDU session or emergency PDU session based on the PDU Session ID; in this case, the SMF shall not create a new SM context but instead update the existing SM context and provide the representation of the updated SM context in the "201 Created" response to the NF Service Consumer.

The POST request shall be considered as colliding with an existing SM context if:

- it includes the same SUPI, or PEI for an emergency registered UE without a UICC or without an authenticated SUPI, and the same PDU Session ID as for an existing SM context; and

- this is a request to establish a new PDU session, i.e.:

- the RequestType IE is present in the request and set to INITIAL_REQUEST or INITIAL_EMERGENCY_REQUEST (e.g. single access PDU session establishment request);

- the RequestType IE and the maRequestInd IE are both absent in the request (e.g. EPS to 5GS mobility); or

- the maRequestInd IE is present in the request (i.e. MA-PDU session establishment request) and the access type indicated in the request corresponds to the access type of the existing SM context.

A POST request that collides with an existing SM context shall be treated as a request for a new SM context. Before creating the new SM context, the SMF should delete the existing SM context locally and any associated resources in the UPF and PCF. See also clause 5.2.3.3.1 for the handling of requests which collide with an existing SM context. If the smContextStatusUri of the existing SM context differs from the smContextStatusUri received in the POST request, the SMF shall also send an SM context status notification (see clause 5.2.2.5) targeting the smContextStatusUri of the existing SM context to notify the release of the existing SM context. For a HR PDU session, if the H-SMF URI in the request is different from the H-SMF URI of the existing PDU session, the V-SMF should also delete the existing PDU session in the H-SMF by invoking the Release service operation (see clause 5.2.2.9). For a PDU session with an I-SMF, if the SMF URI in the request is different from the SMF URI of the existing PDU session, the I-SMF should also delete the existing PDU session in the SMF by invoking the Release service operation (see clause 5.2.2.9).

If the Request Type was received in the request and indicates this is a request for a new PDU session (i.e. INITIAL_REQUEST) and if the Old PDU Session ID was also included in the request, the SMF shall identify the existing PDU session to release and to which the new PDU session establishment relates, based on the Old PDU Session ID.

If no GPSI IE is provided in the request, e.g. for a PDU session moved from another access or another system, and the SMF knows that a GPSI is already associated with the PDU session (or a GPSI is received from h-SMF for a HR PDU session), the SMF shall include the GPSI in the response.

2b. If the request does not include the "UE presence in LADN service area" indication and the SMF determines that the DNN corresponds to a LADN, then the SMF shall consider that the UE is outside of the LADN service area. The SMF shall reject the request if the UE is outside of the LADN service area.

On failure, or redirection during a UE requested PDU Session Establishment, one of the HTTP status code listed in Table 6.1.3.2.3.1-3 shall be returned. For a 4xx/5xx response, the message body shall contain an SmContextCreateError structure, including:

- a ProblemDetails structure with the "cause" attribute set to one of the application error listed in Table 6.1.3.2.3.1-3;

- N1 SM information (PDU Session Reject), if the request included N1 SM information, except if the error prevents the SMF from generating a response to the UE (e.g. invalid request format).

---

* * * Next Change * * * *

5.2.2.2.4    I-SMF Insertion, Change or Removal during Xn based Handover

The NF Service Consumer (e.g. AMF) shall request the I-SMF (for I-SMF insertion or change) or the SMF (for I-SMF removal) to create a SM context during Xn based handover, as follows.

1.  The NF Service Consumer shall send a POST request, with the following additional information:

- N2 SM information received from the target 5G-AN (see Path Switch Request Transfer IE in clause 9.3.4.8 of 3GPP TS 38.413 [9]);

- additional N2 SM information received from the source 5G-AN (see Secondary RAT Data Usage Report Transfer IE in clause 9.3.4.23 of 3GPP TS 38.413 [9]), if any;

- the smContextRef attribute set to the identifier of the SM Context resource in the SMF during I-SMF insertion, or the SM Context resource in the source I-SMF during I-SMF change or removal, and optionally the NF instance identifier of the SMF hosting the SM Context resource.

2a. On success, the SMF shall return a 201 Created response.

The "Location" header shall be present in the POST response and shall contain the URI of the created SM context resource.

The NF Service Consumer (e.g. AMF) shall store the association of the PDU Session ID and the SMF ID.

2b. Same as step 2b of figure 5.2.2.2.1-1.

If the Path Swith Request Transfer IE is included within the N2 SM Information in the request message but the path switch failed, the message body shall contain an SmContextCreateError structure, including:

- N2 SM information (Path Swith Request Unsuccessful Transfer).

---

* * * Next Change * * * *

5.2.2.2.5    I-SMF Insertion, Change or Removal during N2 based Handover

The NF Service Consumer (e.g. AMF) shall request the I-SMF (for I-SMF insertion or change) or the SMF (for I-SMF removal) to create a SM context during N2 based handover, as follows.

1.  The NF Service Consumer shall send a POST request, with the following additional information:

- N2 SM information received from the source NG-RAN (see Handover Required Transfer IE in clause 9.3.4.14 of 3GPP TS 38.413 [9]);

- the hoState attribute set to PREPARING (see clause 5.2.2.3.4.1);

- the smContextRef attribute set to the identifier of the SM Context resource in the SMF during I-SMF insertion,,or the SM Context resource in the source I-SMF during I-SMF change or removal, and optionally the NF instance identifier of the SMF hosting the SM Context resource.

2a. On success, the SMF shall return a 201 Created response including the following information:

- hoState attribute set to PREPARING and N2 SM information to request the target 5G-AN to assign resources to the PDU session, as specified in step 2 of Figure 5.2.2.3.4.2-1;

The "Location" header shall be present in the POST response and shall contain the URI of the created SM context resource.

The NF Service Consumer (e.g. AMF) shall store the association of the PDU Session ID and the SMF ID.

2b. Same as step 2b of figure 5.2.2.2.1-1.

---

* * * Next Change * * * *

Figure 12:
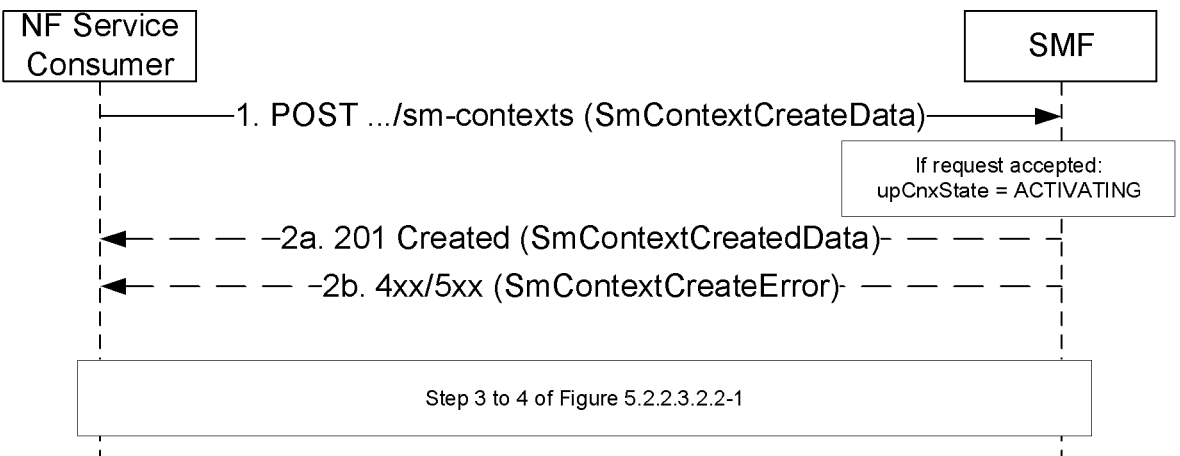
FIG. 12 shows a flowchart of Service Request with I-SMF insertion/change/removal or with V-SMF change according to an embodiment of the disclosure.

5.2.2.2.6    Service Request with I-SMF insertion/change/removal or with V-SMF change The NF Service Consumer (e.g. AMF) shall request the new I-SMF or new V-SMF to create a SM context during a Service Request with I-SMF insertion/change or with V-SMF change, or shall request the SMF to create a SM context during a Service Request with I-SMF removal. FIG.12 shows a flowchart of Service Request with I-SMF insertion/change/removal or with V-SMF change according to an embodiment of the disclosure.

1. The NF Service Consumer shall send a POST request as specified in clause 5.2.2.2.1, with the following additional information:

- the smContextRef attribute set to the identifier of the SM Context resource in the SMF (for a Service Request with an I-SMF insertion) or in the old I-SMF (for a Service Request with an I-SMF change or removal) or in the old V-SMF (for a Service Request with a V-SMF change), and optionally the NF instance identifier of the SMF hosting the SM Context resource.

- the upCnxState attribute set to ACTIVATING (see clause 5.2.2.3.2.1) to indicate the establishment of N3 tunnel User Plane resources for the PDU Session;

2a. On success, the SMF shall return a 201 Created response as specified in clause 5.2.2.2.1 with the following additional information:

- the upCnxState attribute set to ACTIVATING;

- N2 SM information to request the 5G-AN to assign resources to the PDU session (see PDU Session Resource Setup Request Transfer IE in clause 9.3.4.1 of 3GPP TS 38.413 [9]), including the transport layer address and tunnel endpoint of the uplink termination point for the user plane data for this PDU session (i.e. UPF's GTP-U F-TEID for uplink traffic).

2b. Same as step 2b of figure 5.2.2.2.1-1. Steps 3 to 4 are skipped in this case.

---

* * * Next Change * * * *

5.2.2.2.7    Registration procedure for a UE with a PDU session with I-SMF insertion, change and removal The NF Service Consumer (e.g. AMF) shall request the SMF to create a SM context during UE Registration procedure for a PDU session with I-SMF insertion, change and removal, as follows.

1. Same as step 1 of 5.2.2.2.1-1, the NF Service Consumer shall send a POST request, with the following additional information:

- the smContextRef attribute set to the identifier of the SM Context resource in the SMF during I-SMF insertion or the SM Context resource in the I-SMF during I-SMF removal or the SM Context resource in the old I-SMF during I-SMF change, and optionally the NF instance identifier of the SMF hosting the SM Context resource;

- the upCnxState attribute set to ACTIVATING (see clause 5.2.2.3.2.1) to indicate the establishment of N3 tunnel User Plane resources for the PDU Session, if the UE requested to activate the PDU session.

2a. On success, the SMF shall return a 201 Created response.

If the SMF establishes N3 tunnel User Plane resources for the PDU Session, e.g. due to the NF Service Consumer requesting so or due to buffered DL data in the old I-SMF/I-UPF (see clause 4.23.3 of 3GPP TS 23.502 [3]), the 201 Created response shall contain the following additional information:

- the upCnxState attribute set to ACTIVATING;

- N2 SM information to request the 5G-AN to assign resources to the PDU session (see PDU Session Resource Setup Request Transfer IE in clause 9.3.4.1 of 3GPP TS 38.413 [9]), including the transport layer address and tunnel endpoint of the uplink termination point for the user plane data for this PDU session (i.e. UPF's GTP-U F-TEID for uplink traffic).

The "Location" header shall be present in the POST response and shall contain the URI of the created SM context resource.

The NF Service Consumer (e.g. AMF) shall store the association of the PDU Session ID and the SMF ID.

2b. Same as step 2b of figure 5.2.2.2.1-1.

---

* * * Next Change * * * *

---

6.1.3.2.3.1   POST

This method creates an individual SM context resource in the SMF, or in V-SMF in HR roaming scenarios.
This method shall support the URI query parameters specified in table 6.1.3.2.3.1-1.

Table 6.1.3.2.3.1-1: URI query parameters supported by the POST method on this resource

| Name | Data type | P | Cardinality | Description |
|------|-----------|---|-------------|-------------|
| n/a  |           |   |             |             |

| Name | Data type | P | Cardinality | Description |
|------|-----------|---|-------------|-------------|
| n/a  |           |   |             |             |

This method shall support the request data structures specified in table 6.1.3.2.3.1-2 and the response data structures and response codes specified in table 6.1.3.2.3.1-3.

Table 6.1.3.2.3.1-2: Data structures supported by the POST Request Body on this resource

| Data type | P | Cardinality | Description |
|-----------|---|-------------|-------------|
| SmContextCreateData | M | 1 | Representation of the SM context to be created in the SMF. |

| Data type | P | Cardinality | Description |
|-----------|---|-------------|-------------|
| SmContextCreateData | M | 1 | Representation of the SM context to be created in the SMF. |

Table 6.1.3.2.3.1-3: Data structures supported by the POST Response Body on this resource

| Data type | P | Cardinality | Response codes | Description |
|---|---|---|---|---|
| SmContextCreatedData | M | 1 | 201 Created | Successful creation of an SM context. |
| | | | 307 Temporary Redirect | Temporary redirection, during a UE requested PDU Session Establishment. The response shall include a Location header field containing a different URI. The URI shall be an alternative URI of the resource located on an alternative service instance within the SMF that was selected by the AMF. |
| | | | 308 Permanent Redirect | Permanent redirection, during a UE requested PDU Session Establishment. The response shall include a Location header field containing a different URI. The URI shall be an alternative URI of the resource located on an alternative service instance within the SMF that was selected by the AMF. |
| SmContextCreateError | M | 1 | 400 Bad Request | The "cause" attribute shall be set to one of the errors defined in Table 5.2.7.2-1 of 3GPP TS 29.500 [4]. |
| SmContextCreateError | M | 1 | 403 Forbidden | The "cause" attribute shall be set to one of the following application error:<br>- N1_SM_ERROR<br>- N2_SM_ERROR<br>- SNSSAI_DENIED<br>- DNN_DENIED<br>- PDUTYPE_DENIED<br>- SSC_DENIED<br>- SUBSCRIPTION_DENIED<br>- DNN_NOT_SUPPORTED<br>- PDUTYPE_NOT_SUPPORTED<br>- SSC_NOT_SUPPORTED<br>- HOME_ROUTED_ROAMING_REQUIRED<br>- OUT_OF_LADN_SERVICE_AREA<br>- NO_EPS_5GS_CONTINUITY<br>- INTEGRITY_PROTECTED_MDR_NOT_ACCEPTABLE<br>- DEFAULT_EPS_BEARER_INACTIVE<br>- SERVICE_AUTHORIZATION_FAILED_NEXT_HOP<br>See table 6.1.7.3-1 for the description of these errors. |
| SmContextCreateError | M | 1 | 404 Not Found | The "cause" attribute shall be set to one of the following application error:<br>- CONTEXT_NOT_FOUND<br>See table 6.1.7.3-1 for the description of these errors. |
| SmContextCreateError | M | 1 | 500 Internal Server Error | The "cause" attribute shall be set to one of the errors defined in Table 5.2.7.2-1 of 3GPP TS 29.500 [4] or to one of the following application errors:<br>- INSUFFICIENT_RESOURCES_SLICE<br>- INSUFFICIENT_RESOURCES_SLICE_DNN<br>See table 6.1.7.3-1 for the description of these errors. |
| SmContextCreateError | M | 1 | 503 Service Unavailable | The "cause" attribute shall be set to one of the errors defined in Table 5.2.7.2-1 of 3GPP TS 29.500 [4] or to one of the following application errors:<br>- DNN_CONGESTION<br>- S_NSSAI_CONGESTION<br>See table 6.1.7.3-1 for the description of these errors. |
| SmContextCreateError | M | 1 | 504 Gateway Timeout | The "cause" attribute shall be set to one of the following application error:<br>- PEER_NOT_RESPONDING<br>- NETWORK_FAILURE<br>See table 6.1.7.3-1 for the description of these errors. |
| NOTE: The mandatory HTTP error status codes for the POST method listed in Table 5.2.7.1-1 of 3GPP TS 29.500 [4] other than those specified in the table above also apply, with a ProblemDetails data type (see clause 5.2.7 of 3GPP TS 29.500 [4]). | | | | |

| Data type | P | Cardinality | Response codes | Description |
|---|---|---|---|---|
| SmContextCreatedData | M | 1 | 201 Created | Successful creation of an SM context. |
| | | | 307 Temporary Redirect | Temporary redirection, during a UE requested PDU Session Establishment. The response shall include a Location header field containing a different URI. The URI shall be an alternative URI of the resource located on an alternative service instance within the SMF that was selected by the AMF. |
| | | | 308 Permanent Redirect | Permanent redirection, during a UE requested PDU Session Establishment. The response shall include a Location header field containing a different URI. The URI shall be an alternative URI of the resource located on an alternative service instance within the SMF that was selected by the AMF. |
| SmContextCreateError | M | 1 | 400 Bad Request | The "cause" attribute shall be set to one of the errors defined in Table 5.2.7.2-1 of 3GPP TS 29.500 [4]. |
| SmContextCreateError | M | 1 | 403 Forbidden | The "cause" attribute shall be set to one of the following application error:<br>- N1_SM_ERROR<br>- N2_SM_ERROR<br>- SNSSAI_DENIED<br>- DNN_DENIED<br>- PDUTYPE_DENIED<br>- SSC_DENIED<br>- SUBSCRIPTION_DENIED<br>- DNN_NOT_SUPPORTED<br>- PDUTYPE_NOT_SUPPORTED<br>- SSC_NOT_SUPPORTED<br>- HOME_ROUTED_ROAMING_REQUIRED<br>- OUT_OF_LADN_SERVICE_AREA<br>- NO_EPS_5GS_CONTINUITY<br>- INTEGRITY_PROTECTED_MDR_NOT_ACCEPTABLE<br>- DEFAULT_EPS_BEARER_INACTIVE<br><u>- SERVICE_AUTHORIZATION_FAILED_NEXT_HOP</u><br>See table 6.1.7.3-1 for the description of these errors. |
| SmContextCreateError | M | 1 | 404 Not Found | The "cause" attribute shall be set to one of the following application error:<br>- CONTEXT_NOT_FOUND<br>See table 6.1.7.3-1 for the description of these errors. |
| SmContextCreateError | M | 1 | 500 Internal Server Error | The "cause" attribute shall be set to one of the errors defined in Table 5.2.7.2-1 of 3GPP TS 29.500 [4] or to one of the following application errors:<br>- INSUFFICIENT_RESOURCES_SLICE<br>- INSUFFICIENT_RESOURCES_SLICE_DNN<br>See table 6.1.7.3-1 for the description of these errors. |
| SmContextCreateError | M | 1 | 503 Service Unavailable | The "cause" attribute shall be set to one of the errors defined in Table 5.2.7.2-1 of 3GPP TS 29.500 [4] or to one of the following application errors:<br>- DNN_CONGESTION<br>- S_NSSAI_CONGESTION<br>See table 6.1.7.3-1 for the description of these errors. |
| SmContextCreateError | M | 1 | 504 Gateway Timeout | The "cause" attribute shall be set to one of the following application error:<br>- PEER_NOT_RESPONDING<br>- NETWORK_FAILURE<br>See table 6.1.7.3-1 for the description of these errors. |
| NOTE: | | | | The mandatory HTTP error status codes for the POST method listed in Table 5.2.7.1-1 of 3GPP TS 29.500 [4] other than those specified in the table above also apply, with a ProblemDetails data type (see clause 5.2.7 of 3GPP TS 29.500 [4]). |

* * * Next Change * * * *

6.1.6.2.2    Type: SmContextCreateData

Table 6.1.6.2.2-1: Definition of type SmContextCreateData

| Attribute name | Data type | P | Cardi nality | Description | Applica bility |
|---|---|---|---|---|---|
| supi | Supi | C | 0..1 | This IE shall be present, except if the UE is emergency registered and UICCless. When present, it shall contain the subscriber permanent identify. | |
| unauthenticatedSupi | boolean | C | 0..1 | This IE shall be present if the SUPI is present in the message but is not authenticated and is for an emergency registered UE. When present, it shall be set as follows: - true: unauthenticated SUPI; <br><br> - false (default): authenticated SUPI. | |
| pei | Pei | C | 0..1 | This IE shall be present if the UE is emergency registered and it is either UICIless or the SUPI is not authenticated. For all other cases, this IE shall be present if it is available. When present, it shall contain the permanent equipment identifier. | |
| gpsi | Gpsi | C | 0..1 | This IE shall be present if it is available. When present, it shall contain the user's GPSI. | |
| pduSessionId | PduSessionId | C | 0..1 | This IE shall be present, except during an EPS to 5GS Idle mode mobility or handover using the N26 interface. When present, it shall contain the PDU Session ID. | |
| dnn | Dnn | C | 0..1 | This IE shall be present, except during an EPS to 5GS Idle mode mobility or handover using the N26 interface. When present, it shall contain the requested DNN; the DNN shall be the full DNN (i.e. with both the Network Identifier and Operator Identifier) for a HR PDU session, and it should be the full DNN in LBO and non-roaming scenarios. If the Operator Identifier is absent, the serving core network operator shall be assumed. | |
| selectedDnn | Dnn | C | 0..1 | This IE shall be present, if another DNN other than the UE requested DNN is selected for this PDU session. When present, it shall contain the selected DNN. The DNN shall be the full DNN (i.e. with both the Network Identifier and Operator Identifier) for a HR PDU session, and it should be the full DNN in LBO and non-roaming scenarios. If the Operator Identifier is absent, the serving core network operator shall be assumed. | |
| sNssai | Snssai | C | 0..1 | This IE shall be present during the PDU session establishment procedure. In this case, it shall contain the requested S-NSSAI for the serving PLMN. This corresponds to an S-NSSAI from the allowed NSSAI. <br><br> This IE shall also be present during an EPS to 5GS idle mode mobility or handover with I-SMF/V-SMF involved using the N26 interface. In this case, it shall contain the S-NSSAI configured in the AMF for EPS interworking. | |
| hplmnSnssai | Snssai | C | 0..1 | This IE shall be present for a roaming PDU session, except during an EPS to 5GS idle mode mobility or handover using the N26 interface. When present, it shall contain the requested S-NSSAI for the HPLMN. This corresponds to an S-NSSAI from the Mapping Of Allowed NSSAI corresponding to the SNSSAI value included in the sNssai IE. | |
| servingNfId | NfInstanceId | M | 1 | This IE shall contain the identifier of the serving NF (e.g. serving AMF). | |

| guami | Guami | C | 0..1 | This IE shall contain the serving AMF's GUAMI. It shall be included if the NF service consumer is an AMF. | |
| serviceName | ServiceName | O | 0..1 | When present, this IE shall contain the name of the AMF service to which SM context status notifications are to be sent (see clause 6.5.2.2 of 3GPP TS 29.500 [4]). This IE may be included if the NF service consumer is an AMF. | |
| servingNetwork | PlmnIdNid | M | 1 | This IE shall contain the serving core network operator PLMN ID and, for an SNPN, the NID that together with the PLMN ID identifies the SNPN. | |
| requestType | RequestType | C | 0..1 | This IE shall be present if the request relates to an existing PDU session or an existing emergency PDU session, except during an EPS to 5GS idle mode mobility or handover using the N26 interface. It may be present otherwise. When present, it shall indicate whether the request refers to a new PDU session or emergency PDU session, or to an existing PDU session or emergency PDU session. | |
| n1SmMsg | RefToBinaryData | C | 0..1 | This IE shall be present and reference the N1 SM Message binary data (see clause 6.1.6.4.2), except during an EPS to 5GS Idle mode mobility or handover using N26. | |
| anType | AccessType | M | 1 | This IE shall indicate the Access Network Type to which the PDU session is to be associated. | |
| additionalAnType | AccessType | C | 0..1 | This IE shall indicate the additional Access Network Type to which the PDU session is to be associated. This IE shall be present if a MA-PDU session is requested and the UE is registered over both 3GPP access and Non-3GPP access. | MAPDU |
| ratType | RatType | C | 0..1 | This IE shall be present and indicate the RAT Type used by the UE, if available. | |
| presenceInLadn | PresenceState | C | 0..1 | This IE shall be present if the DNN corresponds to a LADN. When present, it shall be set to "IN" or "OUT" to indicate that the UE is in or out of the LADN service area. | |
| ueLocation | UserLocation | C | 0..1 | This IE shall contain the UE location information, if it is available. See NOTE. | |
| ueTimeZone | TimeZone | C | 0..1 | This IE shall contain the UE Time Zone, if it is available. | |
| addUeLocation | UserLocation | O | 0..1 | Additional UE location. This IE may be present, if anType indicates a non-3GPP access and valid 3GPP access user location information is available. When present, it shall contain: - the last known 3GPP access user location; and - the timestamp, if available, indicating the UTC time when the addUeLocation information was acquired. (NOTE) | |
| smContextStatusUri | Uri | M | 1 | This IE shall include the callback URI to receive notification of SM context status. | |
| hSmfUri | Uri | C | 0..1 | This IE shall be present in HR roaming scenarios, including Indirect Communication with Delegated Discovery. When present, it shall contain the API URI of the Nsmf_PDUSession service of the selected H-SMF. The API URI shall be formatted as specified in clause 6.1.1. | |
| hSmfId | NfInstanceId | O | 0..1 | This IE may be present when hSmfUri is present. If present, this IE shall carry the NF instance ID of the selected H-SMF. (NOTE x) | |
| smfUri | Uri | C | 0..1 | This IE shall be present for a PDU session with an I-SMF, including Indirect Communication with Delegated Discovery. When present, it shall contain | DTSSA |

| | | | | the API URI of the Nsmf_PDUSession service of the selected SMF. The API URI shall be formatted as specified in clause 6.1.1. | |
|---|---|---|---|---|---|
| smfId | NfInstanceId | O | 0..1 | This IE may be present when smfUri is present.<br><br>If present, this IE shall carry the NF instance ID of the selected SMF. (NOTE x) | DTSSA |
| oldPduSessionId | PduSessionId | C | 0..1 | This IE shall be present if this information is received from the UE.<br>When present, it shall contain the old PDU Session ID received from the UE. See clauses 4.3.2.2.1 and 4.3.5.2 of 3GPP TS 23.502 [3]. | |
| pduSessionsActivateList | array(PduSessionId) | C | 1..N | This IE shall be present, during an EPS to 5GS Idle mode mobility using the N26 interface, if the UE indicated PDU session(s) to be activated in the Registration Request.<br>When present, it shall indicate all the PDU session(s) requested to be re-activated by the UE. | |
| ueEpsPdnConnection | EpsPdnCnxContainer | C | 0..1 | This IE shall be present, during an EPS to 5GS Idle mode mobility or handover using the N26 interface.<br>When present, it shall contain an MME/SGSN UE EPS PDN connection including the EPS bearer context(s). | |
| hoState | HoState | C | 0..1 | This IE shall be present during an EPS to 5GS handover using N26 interface, to request the preparation of a handover of the PDU session.<br>When present, it shall be set as specified in clause 5.2.2.2.3. | |
| additionalHsmfUri | array(Uri) | O | 1..N | This IE may be present in HR roaming scenarios. When present, it shall contain an array of API URI of the Nsmf_PDUSession service of the additional H-SMFs discovered by the AMF for the given DNN, hplmnSnssai and for this PDU session. If provided, the V-SMF shall use these additional H-SMF(s) if the V-SMF is not able to receive any response from the H-SMF identified by hSmfUri.<br><br>The API URI shall be formatted as specified in clause 6.1.1. | |
| additionalHsmfId | array(NfInstanceId) | O | 1..N | This IE may be present when additionalHsmfUri is present.<br><br>If present, this IE shall carry the NF instance ID(s) of H-SMF(s) as stated in additionalHsmfUri IE, in exactly the same order. (NOTE x) | |
| additionalSmfUri | array(Uri) | O | 1..N | This IE may be present for a PDU session with an I-SMF. When present, it shall contain an array of API URI of the Nsmf_PDUSession service of the additional SMFs discovered by the AMF for the given DNN, Snssai and for this PDU session. If provided, the I-SMF shall use these additional SMF(s) if the I-SMF is not able to receive any response from the SMF identified by smfUri.<br><br>The API URI shall be formatted as specified in clause 6.1.1. | DTSSA |
| additionalSmfId | array(NfInstanceId) | O | 1..N | This IE may be present when additionalSmfUri is present.<br><br>If present, this IE shall carry the NF instance ID(s) of SMF(s) as stated in additionalSmfUri IE, in exactly the same order. (NOTE x) | DTSSA |
| pcfId | NfInstanceId | O | 0..1 | When present, this IE shall contain the identifier of the PCF selected by the AMF for the UE (for Access and Mobility Policy and/or UE Policy); it shall be the V-PCF in LBO roaming and the H-PCF in HR roaming. | |
| pcfGroupId | NfGroupId | O | 0..1 | This IE may be present in non-roaming and HR roaming scenarios.<br>When present, this IE shall contain the identity of the | |

| | | | | |
|---|---|---|---|---|
| | | | | (home) PCF group serving the UE for Access and Mobility Policy and/or UE Policy. |
| pcfSetId | NfSetId | O | 0..1 | When present, this IE shall contain the NF Set ID of the PCF serving the UE for Access and Mobility Policy and/or UE Policy. It shall be the V-PCF Set ID in LBO roaming and the H-PCF Set ID in HR roaming. |
| nrfUri | Uri | O | 0..1 | This IE may be present to indicate the NRF to use for PCF selection within the same network slice instance. When present, the SMF shall use the NRF URI to select the PCF. |
| supportedFeatures | SupportedFeatures | C | 0..1 | This IE shall be present if at least one optional feature defined in clause 6.1.8 is supported. |
| selMode | DnnSelectionMode | C | 0..1 | This IE shall be present if it is available. When present, it shall indicate whether the requested DNN corresponds to an explicitly subscribed DNN or to the usage of a wildcard subscription. |
| backupAmfInfo | array(BackupAmfInfo) | C | 1..N | This IE shall be included if the NF service consumer is an AMF and the AMF supports the AMF management without UDSF for the following cases:<br>- First interaction with SMF.<br><br>- Modification of the BackupAmfInfo. |
| traceData | TraceData | C | 0..1 | This IE shall be included if trace is required to be activated (see 3GPP TS 32.422 [22]). |
| udmGroupId | NfGroupId | O | 0..1 | When present, it shall indicate the identity of the UDM group serving the UE. |
| routingIndicator | string | O | 0..1 | When present, it shall indicate the Routing Indicator of the UE. |
| epsInterworkingInd | EpsInterworkingIndication | O | 0..1 | The AMF may provide the indication when a PGW-C+SMF is selected to serve the PDU Session.<br><br>When present, this IE shall indicate whether the PDU session may possibly be moved to EPS and whether N26 interface to be used during EPS interworking procedures.<br><br>The AMF may derive the value of the indication from different sources, like UE radio capabilities (e.g. "S1 mode supported"), UE subscription data (e.g. "Core Network Type Restriction to EPC" and "Interworking with EPS Indication" for the DNN) and configurations. |
| indirectForwardingFlag | boolean | C | 0..1 | The AMF shall include this indication during N26 based Handover procedure from EPS to 5GS (see 3GPP TS 23.502 [3], clause 4.11.1.2.2), to inform the SMF of the applicability or non-applicability of indirect data forwarding.<br>When present, it shall be set as follows:<br>- True: indirect data forwarding is applicable<br>- False: indirect data forwarding is not applicable |
| directForwardingFlag | boolean | C | 0..1 | The AMF shall include this indication during N26 based Handover procedure from EPS to 5GS (see 3GPP TS 23.502 [3], clause 4.11.1.2.2), to inform the SMF of the applicability or non-applicability of direct data forwarding.<br>When present, it shall be set as follows:<br>- True: direct data forwarding is applicable<br>- False: direct data forwarding is not applicable |
| targetId | NgRanTargetId | C | 0..1 | This IE shall be present in the following cases:<br>- during an EPS to 5GS handover preparation using the N26 interface, when the hoState IE is set to the value "PREPARING";<br>- during N2 based handover procedure with I-SMF or V-SMF insertion/change/removal, when hostate IE is set to the value "PREPARING".<br>When present, it shall contain the Target ID identifying the target RAN Node ID and TAI. In case of EPS to 5GS handover, the TAI is received in the Forward |

| | | | | | |
|---|---|---|---|---|---|
| | | | | Relocation Request from the Source MME. | |
| epsBearerCtxStatus | EpsBearerContextStatus | C | 0..1 | This IE shall be present during an EPS to 5GS idle mode mobility using the N26 interface, if received in the Registration Request from the UE.<br>When present, it shall be set to the value received from the UE. | |
| cpCiotEnabled | boolean | C | 0..1 | This IE shall be present with the value "True", if<br>- the NF service consumer (e.g. the AMF) has verified that the CIOT feature is supported by the SMF (and for a home-routed session, that it is also supported by the H-SMF); and<br>- Control Plane CIoT 5GS Optimisation is enabled for the PDU session<br>(see 3GPP TS 23.502 [3], clauses 4.3.2.2.1 and 4.3.2.2.2).<br><br>When present, it shall be set as follows:<br>- True: Control Plane CIoT 5GS Optimisation is enabled.<br>- False (default): Control Plane CIoT 5GS Optimisation is not enabled. | CIOT |
| cpOnlyInd | boolean | C | 0..1 | This IE shall be present with the value "True", if the PDU session shall only use Control Plane CIoT 5GS Optimisation (see clause 5.31.4.1 of 3GPP TS 23.501 [2]).<br><br>When present, it shall be set as follows:<br>- True: the PDU session shall only use Control Plane CIoT 5GS Optimisation<br>- False (default): the PDU session is not constrained to only use Control Plane CIoT 5GS Optimisation. | CIOT |
| invokeNef | boolean | C | 0..1 | This IE shall be present with the value "True", if Control Plane CIoT 5GS Optimisation is enabled and data delivery via NEF is selected for the PDU session (see 3GPP TS 23.502 [3], clause 4.3.2.2.2).<br><br>When present, it shall be set as follows:<br>- True: Data delivery via NEF is selected.<br>- False (default): Data delivery via NEF is not selected. | CIOT |
| maRequestInd | boolean | C | 0..1 | This IE shall be present if a MA-PDU session is requested to be established.<br>When present, it shall be set as follows:<br>- True: a MA-PDU session is requested<br>- False (default): a MA-PDU session is not requested | MAPDU |
| maNwUpgradeInd | boolean | C | 0..1 | This IE shall only be present if the PDU session is allowed to be upgraded to MA PDU session (see clause 4.22.3 of 3GPP TS 23.502 [3]).<br><br>When present, it shall be set as follows:<br>- True: the PDU session is allowed to be upgraded to MA PDU session<br>- False (default): the PDU session is not allowed to be upgraded to MA PDU session<br><br>When maRequestInd is present and set to "true", this IE shall not be present. | MAPDU |
| n2SmInfo | RefToBinaryData | C | 0..1 | This IE shall be present if N2 SM Information needs to be sent to the I-SMF. | DTSSA |
| n2SmInfoType | N2SmInfoType | C | 0..1 | This IE shall be present if "n2SmInfo" attribute is present.<br>When present, this IE shall indicate the NG AP IE type for the NG AP SMF related IE container carried in "n2SmInfo" attribute. | DTSSA |

| n2SmInfoExt1 | RefToBinaryData | C | 0..1 | This IE shall be present if more than one N2 SM Information has been received from the AN.<br>When present, this IE shall reference the N2 SM Information binary data (see clause 6.1.6.4.3). | DTSSA |
|---|---|---|---|---|---|
| n2SmInfoTypeExt1 | N2SmInfoType | C | 0..1 | This IE shall be present if "n2SmInfoExt1" attribute is present.<br>When present, this IE shall indicate the NG AP IE type for the NG AP SMF related IE container carried in "n2SmInfoExt1" attribute. | DTSSA |
| smContextRef | Uri | C | 0..1 | This IE shall be present during an I-SMF or V-SMF insertion if available and during an I-SMF or V-SMF change or removal.<br>When present, this IE shall contain the URI of the SM Context resource in the SMF or of the SM context resource in the source I-SMF or V-SMF during an I-SMF or V-SMF insertion or during an I-SMF or V-SMF change/removal respectively. The URI shall be an absolute URI, including apiRoot (see clause 6.1.3.3.2). | DTSSA |
| smContextSmfId | NfInstanceId | O | 0..1 | This IE may be present if smContextRef is present.<br><br>When present, this IE shall carry the NF instance ID of the SMF which hosts the SM Context resource indeitified by smContextRef IE. (NOTE x) | DTSSA |
| upCnxState | UpCnxState | C | 0..1 | This IE shall be present to request the activation of the user plane connection of the PDU session, during a Service Request with an I-SMF insertion / change / removal, or with a V-SMF change (see clause 5.2.2.2.6). | DTSSA |
| smallDataRateStatus | SmallDataRateStatus | C | 0..1 | This IE shall be present if the small data rate control status is available in AMF, see clause 5.31.14.3 of 3GPP TS 23.501 [2] and clause 4.3.2.2.1 of 3GPP TS 23.502 [3]. | CIOT |
| apnRateStatus | ApnRateStatus | C | 0..1 | This IE shall be present if the APN rate control status is available in AMF, see clause 4.7.7.3 in 3GPP TS 23.401 [33] and clause 5.2.8.2.5 in 3GPP TS 23.502 [3]. | CIOT |
| extendedNasSmTimerInd | boolean | C | 0..1 | This IE shall be present with the value "True" if the UE supports CE mode B and use of CE mode B is not restricted according to the Enhanced Coverage Restriction information in the UE context in the AMF.<br><br>When present, it shall indicate whether extended NAS SM timers shall be used for the UE as specified in 3GPP TS 24.501 [7], as follows:<br>- True: extended NAS SM timers shall be used<br>- False (default): normal NAS SM timers shall be used. | CIOT |
| dlDataWaitingInd | boolean | C | 0..1 | This IE shall be present during an EPS to 5GS Idle mode mobility using N26 interface with data forwarding (see clause 4.11.1.3.3A of 3GPP TS 23.502 [3]), if the same indication is received from the MME in the Context Response message.<br><br>When present, it shall be set as follows:<br>- true: DL data needs to be sent to the UE;<br><br>- false (default): no DL data needs to be sent to the UE. | CIOT |
| ddnFailureSubs | DdnFailureSubs | C | 0..1 | This IE shall be present to subscribe the notification of the DDN Failure if the Availability after DDN failure event is subscribed by the UDM, see clause 4.15.3.2.7 of 3GPP TS 23.502 [3]. | CIOT |
| smfTransferInd | boolean | C | 0..1 | This IE shall be present during an SMF Context Transfer procedure, LBO or no Roaming, no I-SMF.<br>When present, it shall be set as follows:<br>- True: SMF Context Transfer | CTXTR |

| | | | | - False (default): Not an SMF Context Transfer | |
|---|---|---|---|---|---|
| oldSmfId | NfInstanceId | C | 0..1 | This IE shall be present if smfTransferInd is set to true. When present, it shall indicate old SMF instance identifier. | CTXTR |
| oldSmContextRef | Uri | C | 0..1 | This IE shall be present if smfTransferInd is set to true. When present, this IE shall contain the identifier of the SM Context resource in the old SMF. | CTXTR |
| wAgfInfo | WAgfInfo | C | 0..1 | This IE shall be present, if received from the W-AGF. When present, it shall contain information about the N3 terminations of the W-AGF. The SMF may use this information when selecting the UPF. | |
| tngfInfo | tngfInfo | C | 0..1 | This IE shall be present, if received from the TNGF. When present, it shall contain information about the N3 terminations of the TNGF. The SMF may use this information when selecting the UPF. | |
| twifInfo | twifInfo | C | 0..1 | This IE shall be present, if received from the TWIF. When present, it shall contain information about the N3 terminations of the TWIF. The SMF may use this information when selecting the UPF. | |
| NOTE: | In shared networks, when the message is sent from the VPLMN to the HPLMN, the PLMN ID that is communicated in this IE shall be that of the selected Core Network Operator. In shared networks, when the AMF and SMF pertain to the same PLMN, the Primary PLMN ID shall be communicated in the ECGI or NCGI to the SMF. The Core Network Operator PLMN ID shall be communicated in the TAI and the Serving Network. | | | | |
| NOTE x: | If OAuth is enabled for the indicated SMF, the new SMF shall use the NF instance Identifier to acquire the access token for the Nsmf_PduSession service on the indicated SMF. | | | | |

| Attribute name | Data type | P | Cardi nality | Description | Applica bility |
|---|---|---|---|---|---|
| supi | Supi | C | 0..1 | This IE shall be present, except if the UE is emergency registered and UICCless. When present, it shall contain the subscriber permanent identify. | |
| unauthenticatedSupi | boolean | C | 0..1 | This IE shall be present if the SUPI is present in the message but is not authenticated and is for an emergency registered UE. When present, it shall be set as follows: - true: unauthenticated SUPI; - false (default): authenticated SUPI. | |
| pei | Pei | C | 0..1 | This IE shall be present if the UE is emergency registered and it is either UICIless or the SUPI is not authenticated. For all other cases, this IE shall be present if it is available. When present, it shall contain the permanent equipment identifier. | |
| gpsi | Gpsi | C | 0..1 | This IE shall be present if it is available. When present, it shall contain the user's GPSI. | |
| pduSessionId | PduSessionId | C | 0..1 | This IE shall be present, except during an EPS to 5GS Idle mode mobility or handover using the N26 interface. When present, it shall contain the PDU Session ID. | |
| dnn | Dnn | C | 0..1 | This IE shall be present, except during an EPS to 5GS Idle mode mobility or handover using the N26 interface. When present, it shall contain the requested DNN; the DNN shall be the full DNN (i.e. with both the Network Identifier and Operator Identifier) for a HR PDU session, and it should be the full DNN in LBO and non-roaming scenarios. If the Operator Identifier is absent, the serving core network operator shall be assumed. | |
| selectedDnn | Dnn | C | 0..1 | This IE shall be present, if another DNN other than the UE requested DNN is selected for this PDU session. | |

| | | | | When present, it shall contain the selected DNN. The DNN shall be the full DNN (i.e. with both the Network Identifier and Operator Identifier) for a HR PDU session, and it should be the full DNN in LBO and non-roaming scenarios. If the Operator Identifier is absent, the serving core network operator shall be assumed. | |
|---|---|---|---|---|---|
| sNssai | Snssai | C | 0..1 | This IE shall be present during the PDU session establishment procedure. In this case, it shall contain the requested S-NSSAI for the serving PLMN. This corresponds to an S-NSSAI from the allowed NSSAI.<br><br>This IE shall also be present during an EPS to 5GS idle mode mobility or handover with I-SMF/V-SMF involved using the N26 interface. In this case, it shall contain the S-NSSAI configured in the AMF for EPS interworking. | |
| hplmnSnssai | Snssai | C | 0..1 | This IE shall be present for a roaming PDU session, except during an EPS to 5GS idle mode mobility or handover using the N26 interface.<br>When present, it shall contain the requested S-NSSAI for the HPLMN. This corresponds to an S-NSSAI from the Mapping Of Allowed NSSAI corresponding to the SNSSAI value included in the sNssai IE. | |
| servingNfId | NfInstanceId | M | 1 | This IE shall contain the identifier of the serving NF (e.g. serving AMF). | |
| guami | Guami | C | 0..1 | This IE shall contain the serving AMF's GUAMI. It shall be included if the NF service consumer is an AMF. | |
| serviceName | ServiceName | O | 0..1 | When present, this IE shall contain the name of the AMF service to which SM context status notifications are to be sent (see clause 6.5.2.2 of 3GPP TS 29.500 [4]). This IE may be included if the NF service consumer is an AMF. | |
| servingNetwork | PlmnIdNid | M | 1 | This IE shall contain the serving core network operator PLMN ID and, for an SNPN, the NID that together with the PLMN ID identifies the SNPN. | |
| requestType | RequestType | C | 0..1 | This IE shall be present if the request relates to an existing PDU session or an existing emergency PDU session, except during an EPS to 5GS idle mode mobility or handover using the N26 interface. It may be present otherwise.<br>When present, it shall indicate whether the request refers to a new PDU session or emergency PDU session, or to an existing PDU session or emergency PDU session. | |
| n1SmMsg | RefToBinaryData | C | 0..1 | This IE shall be present and reference the N1 SM Message binary data (see clause 6.1.6.4.2), except during an EPS to 5GS Idle mode mobility or handover using N26. | |
| anType | AccessType | M | 1 | This IE shall indicate the Access Network Type to which the PDU session is to be associated. | |
| additionalAnType | AccessType | C | 0..1 | This IE shall indicate the additional Access Network Type to which the PDU session is to be associated. This IE shall be present if a MA-PDU session is requested and the UE is registered over both 3GPP access and Non-3GPP access. | MAPDU |
| ratType | RatType | C | 0..1 | This IE shall be present and indicate the RAT Type used by the UE, if available. | |
| presenceInLadn | PresenceState | C | 0..1 | This IE shall be present if the DNN corresponds to a LADN. When present, it shall be set to "IN" or "OUT" to indicate that the UE is in or out of the LADN service area. | |
| ueLocation | UserLocation | C | 0..1 | This IE shall contain the UE location information, if it is available. See NOTE. | |
| ueTimeZone | TimeZone | C | 0..1 | This IE shall contain the UE Time Zone, if it is available. | |
| addUeLocation | UserLocation | O | 0..1 | Additional UE location. This IE may be present, if anType indicates a | |

| | | | | non-3GPP access and valid 3GPP access user location information is available.<br>When present, it shall contain:<br>- the last known 3GPP access user location; and<br><br>- the timestamp, if available, indicating the UTC time when the addUeLocation information was acquired.<br><br>(NOTE) | |
|---|---|---|---|---|---|
| smContextStatusUri | Uri | M | 1 | This IE shall include the callback URI to receive notification of SM context status. | |
| hSmfUri | Uri | C | 0..1 | This IE shall be present in HR roaming scenarios, including Indirect Communication with Delegated Discovery. When present, it shall contain the API URI of the Nsmf_PDUSession service of the selected H-SMF. The API URI shall be formatted as specified in clause 6.1.1. | |
| hSmfId | NfInstanceId | O | 0..1 | This IE may be present when hSmfUri is present.<br><br>If present, this IE shall carry the NF instance ID of the selected H-SMF. (NOTE x) | |
| smfUri | Uri | C | 0..1 | This IE shall be present for a PDU session with an I-SMF, including Indirect Communication with Delegated Discovery. When present, it shall contain the API URI of the Nsmf_PDUSession service of the selected SMF. The API URI shall be formatted as specified in clause 6.1.1. | DTSSA |
| smfId | NfInstanceId | O | 0..1 | This IE may be present when smfUri is present.<br><br>If present, this IE shall carry the NF instance ID of the selected SMF. (NOTE x) | DTSSA |
| oldPduSessionId | PduSessionId | C | 0..1 | This IE shall be present if this information is received from the UE.<br>When present, it shall contain the old PDU Session ID received from the UE. See clauses 4.3.2.2.1 and 4.3.5.2 of 3GPP TS 23.502 [3]. | |
| pduSessionsActivateList | array(PduSessionId) | C | 1..N | This IE shall be present, during an EPS to 5GS Idle mode mobility using the N26 interface, if the UE indicated PDU session(s) to be activated in the Registration Request.<br>When present, it shall indicate all the PDU session(s) requested to be re-activated by the UE. | |
| ueEpsPdnConnection | EpsPdnCnxContainer | C | 0..1 | This IE shall be present, during an EPS to 5GS Idle mode mobility or handover using the N26 interface. When present, it shall contain an MME/SGSN UE EPS PDN connection including the EPS bearer context(s). | |
| hoState | HoState | C | 0..1 | This IE shall be present during an EPS to 5GS handover using N26 interface, to request the preparation of a handover of the PDU session.<br>When present, it shall be set as specified in clause 5.2.2.2.3. | |
| additionalHsmfUri | array(Uri) | O | 1..N | This IE may be present in HR roaming scenarios. When present, it shall contain an array of API URI of the Nsmf_PDUSession service of the additional H-SMFs discovered by the AMF for the given DNN, hplmnSnssai and for this PDU session. If provided, the V-SMF shall use these additional H-SMF(s) if the V-SMF is not able to receive any response from the H-SMF identified by hSmfUri.<br><br>The API URI shall be formatted as specified in clause 6.1.1. | |
| additionalHsmfId | array(NfInstanceId) | O | 1..N | This IE may be present when additionalHsmfUri is present.<br><br>If present, this IE shall carry the NF instance ID(s) of | |

| | | | | H-SMF(s) as stated in additionalHsmfUri IE, in exactly the same order. (NOTE x) | |
|---|---|---|---|---|---|
| additionalSmfUri | array(Uri) | O | 1..N | This IE may be present for a PDU session with an I-SMF. When present, it shall contain an array of API URI of the Nsmf_PDUSession service of the additional SMFs discovered by the AMF for the given DNN, Snssai and for this PDU session. If provided, the I-SMF shall use these additional SMF(s) if the I-SMF is not able to receive any response from the SMF identified by smfUri.<br><br>The API URI shall be formatted as specified in clause 6.1.1. | DTSSA |
| additionalSmfId | array(NfInstanceId) | O | 1..N | This IE may be present when additionalSmfUri is present.<br><br>If present, this IE shall carry the NF instance ID(s) of SMF(s) as stated in additionalSmfUri IE, in exactly the same order. (NOTE x) | DTSSA |
| pcfId | NfInstanceId | O | 0..1 | When present, this IE shall contain the identifier of the PCF selected by the AMF for the UE (for Access and Mobility Policy and/or UE Policy); it shall be the V-PCF in LBO roaming and the H-PCF in HR roaming. | |
| pcfGroupId | NfGroupId | O | 0..1 | This IE may be present in non-roaming and HR roaming scenarios.<br>When present, this IE shall contain the identity of the (home) PCF group serving the UE for Access and Mobility Policy and/or UE Policy. | |
| pcfSetId | NfSetId | O | 0..1 | When present, this IE shall contain the NF Set ID of the PCF serving the UE for Access and Mobility Policy and/or UE Policy. It shall be the V-PCF Set ID in LBO roaming and the H-PCF Set ID in HR roaming. | |
| nrfUri | Uri | O | 0..1 | This IE may be present to indicate the NRF to use for PCF selection within the same network slice instance. When present, the SMF shall use the NRF URI to select the PCF. | |
| supportedFeatures | SupportedFeatures | C | 0..1 | This IE shall be present if at least one optional feature defined in clause 6.1.8 is supported. | |
| selMode | DnnSelectionMode | C | 0..1 | This IE shall be present if it is available. When present, it shall indicate whether the requested DNN corresponds to an explicitly subscribed DNN or to the usage of a wildcard subscription. | |
| backupAmfInfo | array(BackupAmfInfo) | C | 1..N | This IE shall be included if the NF service consumer is an AMF and the AMF supports the AMF management without UDSF for the following cases:<br>- First interaction with SMF.<br><br>- Modification of the BackupAmfInfo. | |
| traceData | TraceData | C | 0..1 | This IE shall be included if trace is required to be activated (see 3GPP TS 32.422 [22]). | |
| udmGroupId | NfGroupId | O | 0..1 | When present, it shall indicate the identity of the UDM group serving the UE. | |
| routingIndicator | string | O | 0..1 | When present, it shall indicate the Routing Indicator of the UE. | |
| epsInterworkingInd | EpsInterworkingIndication | O | 0..1 | The AMF may provide the indication when a PGW-C+SMF is selected to serve the PDU Session.<br><br>When present, this IE shall indicate whether the PDU session may possibly be moved to EPS and whether N26 interface to be used during EPS interworking procedures.<br><br>The AMF may derive the value of the indication from different sources, like UE radio capabilities (e.g. "S1 mode supported"), UE subscription data (e.g. "Core Network Type Restriction to EPC" and "Interworking with EPS Indication" for the DNN) and configurations. | |
| indirectForwardingFlag | boolean | C | 0..1 | The AMF shall include this indication during N26 based Handover procedure from EPS to 5GS (see | |

| | | | | 3GPP TS 23.502 [3], clause 4.11.1.2.2), to inform the SMF of the applicability or non-applicability of indirect data forwarding.<br>When present, it shall be set as follows:<br>  - True: indirect data forwarding is applicable<br>  - False: indirect data forwarding is not applicable | |
|---|---|---|---|---|---|
| directForwardingFlag | boolean | C | 0..1 | The AMF shall include this indication during N26 based Handover procedure from EPS to 5GS (see 3GPP TS 23.502 [3], clause 4.11.1.2.2), to inform the SMF of the applicability or non-applicability of direct data forwarding.<br>When present, it shall be set as follows:<br>  - True: direct data forwarding is applicable<br>  - False: direct data forwarding is not applicable | |
| targetId | NgRanTargetId | C | 0..1 | This IE shall be present in the following cases:<br>  - during an EPS to 5GS handover preparation using the N26 interface, when the hoState IE is set to the value "PREPARING";<br>  - during N2 based handover procedure with I-SMF or V-SMF insertion/change/removal, when hostate IE is set to the value "PREPARING".<br>When present, it shall contain the Target ID identifying the target RAN Node ID and TAI. In case of EPS to 5GS handover, the TAI is received in the Forward Relocation Request from the Source MME. | |
| epsBearerCtxStatus | EpsBearerContextStatus | C | 0..1 | This IE shall be present during an EPS to 5GS idle mode mobility using the N26 interface, if received in the Registration Request from the UE.<br>When present, it shall be set to the value received from the UE. | |
| cpCiotEnabled | boolean | C | 0..1 | This IE shall be present with the value "True", if<br>  - the NF service consumer (e.g. the AMF) has verified that the CIOT feature is supported by the SMF (and for a home-routed session, that it is also supported by the H-SMF); and<br>  - Control Plane CIoT 5GS Optimisation is enabled for the PDU session<br>(see 3GPP TS 23.502 [3], clauses 4.3.2.2.1 and 4.3.2.2.2).<br><br>When present, it shall be set as follows:<br>  - True: Control Plane CIoT 5GS Optimisation is enabled.<br>  - False (default): Control Plane CIoT 5GS Optimisation is not enabled. | CIOT |
| cpOnlyInd | boolean | C | 0..1 | This IE shall be present with the value "True", if the PDU session shall only use Control Plane CIoT 5GS Optimisation (see clause 5.31.4.1 of 3GPP TS 23.501 [2]).<br><br>When present, it shall be set as follows:<br>  - True: the PDU session shall only use Control Plane CIoT 5GS Optimisation<br>  - False (default): the PDU session is not constrained to only use Control Plane CIoT 5GS Optimisation. | CIOT |
| invokeNef | boolean | C | 0..1 | This IE shall be present with the value "True", if Control Plane CIoT 5GS Optimisation is enabled and data delivery via NEF is selected for the PDU session (see 3GPP TS 23.502 [3], clause 4.3.2.2.2).<br><br>When present, it shall be set as follows:<br>  - True: Data delivery via NEF is selected.<br>  - False (default): Data delivery via NEF is not selected. | CIOT |

| maRequestInd | boolean | C | 0..1 | This IE shall be present if a MA-PDU session is requested to be established.<br>When present, it shall be set as follows:<br>   - True: a MA-PDU session is requested<br>   - False (default): a MA-PDU session is not requested | MAPDU |
|---|---|---|---|---|---|
| maNwUpgradeInd | boolean | C | 0..1 | This IE shall only be present if the PDU session is allowed to be upgraded to MA PDU session (see clause 4.22.3 of 3GPP TS 23.502 [3]).<br><br>When present, it shall be set as follows:<br>   - True: the PDU session is allowed to be upgraded to MA PDU session<br>   - False (default): the PDU session is not allowed to be upgraded to MA PDU session<br><br>When maRequestInd is present and set to "true", this IE shall not be present. | MAPDU |
| n2SmInfo | RefToBinaryData | C | 0..1 | This IE shall be present if N2 SM Information needs to be sent to the I-SMF. | DTSSA |
| n2SmInfoType | N2SmInfoType | C | 0..1 | This IE shall be present if "n2SmInfo" attribute is present.<br>When present, this IE shall indicate the NG AP IE type for the NG AP SMF related IE container carried in "n2SmInfo" attribute. | DTSSA |
| n2SmInfoExt1 | RefToBinaryData | C | 0..1 | This IE shall be present if more than one N2 SM Information has been received from the AN.<br>When present, this IE shall reference the N2 SM Information binary data (see clause 6.1.6.4.3). | DTSSA |
| n2SmInfoTypeExt1 | N2SmInfoType | C | 0..1 | This IE shall be present if "n2SmInfoExt1" attribute is present.<br>When present, this IE shall indicate the NG AP IE type for the NG AP SMF related IE container carried in "n2SmInfoExt1" attribute. | DTSSA |
| smContextRef | Uri | C | 0..1 | This IE shall be present during an I-SMF or V-SMF insertion if available and during an I-SMF or V-SMF change or removal.<br>When present, this IE shall contain the URI of the SM Context resource in the SMF or of the SM context resource in the source I-SMF or V-SMF during an I-SMF or V-SMF insertion or during an I-SMF or V-SMF change/removal respectively. The URI shall be an absolute URI, including apiRoot (see clause 6.1.3.3.2). | DTSSA |
| smContextSmfId | NfInstanceId | O | 0..1 | This IE may be present if smContextRef is present.<br><br>When present, this IE shall carry the NF instance ID of the SMF which hosts the SM Context resource indeitified by smContextRef IE. (NOTE x) | DTSSA |
| upCnxState | UpCnxState | C | 0..1 | This IE shall be present to request the activation of the user plane connection of the PDU session, during a Service Request with an I-SMF insertion / change / removal, or with a V-SMF change (see clause 5.2.2.2.6). | DTSSA |
| smallDataRateStatus | SmallDataRateStatus | C | 0..1 | This IE shall be present if the small data rate control status is available in AMF, see clause 5.31.14.3 of 3GPP TS 23.501 [2] and clause 4.3.2.2.1 of 3GPP TS 23.502 [3]. | CIOT |
| apnRateStatus | ApnRateStatus | C | 0..1 | This IE shall be present if the APN rate control status is available in AMF, see clause 4.7.7.3 in 3GPP TS 23.401 [33] and clause 5.2.8.2.5 in 3GPP TS 23.502 [3]. | CIOT |
| extendedNasSmTimerInd | boolean | C | 0..1 | This IE shall be present with the value "True" if the UE supports CE mode B and use of CE mode B is not restricted according to the Enhanced Coverage Restriction information in the UE context in the AMF.<br><br>When present, it shall indicate whether extended NAS | CIOT |

| | | | | SM timers shall be used for the UE as specified in 3GPP TS 24.501 [7], as follows:<br>- True: extended NAS SM timers shall be used<br>- False (default): normal NAS SM timers shall be used. | |
|---|---|---|---|---|---|
| dlDataWaitingInd | boolean | C | 0..1 | This IE shall be present during an EPS to 5GS Idle mode mobility using N26 interface with data forwarding (see clause 4.11.1.3.3A of 3GPP TS 23.502 [3]), if the same indication is received from the MME in the Context Response message.<br><br>When present, it shall be set as follows:<br>- true: DL data needs to be sent to the UE;<br><br>- false (default): no DL data needs to be sent to the UE. | CIOT |
| ddnFailureSubs | DdnFailureSubs | C | 0..1 | This IE shall be present to subscribe the notification of the DDN Failure if the Availability after DDN failure event is subscribed by the UDM, see clause 4.15.3.2.7 of 3GPP TS 23.502 [3]. | CIOT |
| smfTransferInd | boolean | C | 0..1 | This IE shall be present during an SMF Context Transfer procedure, LBO or no Roaming, no I-SMF.<br>When present, it shall be set as follows:<br>- True: SMF Context Transfer<br>- False (default): Not an SMF Context Transfer | CTXTR |
| oldSmfId | NfInstanceId | C | 0..1 | This IE shall be present if smfTransferInd is set to true.<br>When present, it shall indicate old SMF instance identifier. | CTXTR |
| oldSmContextRef | Uri | C | 0..1 | This IE shall be present if smfTransferInd is set to true.<br>When present, this IE shall contain the identifier of the SM Context resource in the old SMF. | CTXTR |
| wAgfInfo | WAgfInfo | C | 0..1 | This IE shall be present, if received from the W-AGF.<br>When present, it shall contain information about the N3 terminations of the W-AGF. The SMF may use this information when selecting the UPF. | |
| tngfInfo | tngfInfo | C | 0..1 | This IE shall be present, if received from the TNGF.<br>When present, it shall contain information about the N3 terminations of the TNGF. The SMF may use this information when selecting the UPF. | |
| twifInfo | twifInfo | C | 0..1 | This IE shall be present, if received from the TWIF.<br>When present, it shall contain information about the N3 terminations of the TWIF. The SMF may use this information when selecting the UPF. | |
| NOTE: In shared networks, when the message is sent from the VPLMN to the HPLMN, the PLMN ID that is communicated in this IE shall be that of the selected Core Network Operator.<br>In shared networks, when the AMF and SMF pertain to the same PLMN, the Primary PLMN ID shall be communicated in the ECGI or NCGI to the SMF. The Core Network Operator PLMN ID shall be communicated in the TAI and the Serving Network. | | | | | |
| NOTE x: If OAuth is enabled for the indicated SMF, the new SMF shall use the NF instance Identifier to acquire the access token for the Nsmf_PduSession service on the indicated SMF. | | | | | |

* * * Next Change * * * *

6.1.7.3 Application Errors

The common application errors defined in Table 5.2.7.2-1 of 3GPP TS 29.500 [4] may be used for the Nsmf_PDUSession service.

The following application errors listed in Table 6.1.7.3-1 are specific to the Nsmf_PDUSession service.

Table 6.1.7.3-1: Application errors

| Application Error | HTTP status code | Description |
|---|---|---|
| N1_SM_ERROR | 403 Forbidden | This indicates that an error, other than those listed in this table, was detected when processing the N1 SM information received in the request, e.g. N1 SM protocol error. |
| N2_SM_ERROR | 403 Forbidden | This indicates that an error, other than those listed in this table, was detected when processing the N2 SM information received in the request, e.g. N2 SM protocol error. |
| SNSSAI_DENIED | 403 Forbidden | The subscriber does not have the necessary subscription to access the SNSSAI. |
| DNN_DENIED | 403 Forbidden | The subscriber does not have the necessary subscription to access the DNN. |
| PDUTYPE_DENIED | 403 Forbidden | The subscriber does not have the necessary subscription for the requested PDU session type. |
| SSC_DENIED | 403 Forbidden | The subscriber does not have the necessary subscription for the requested SSC mode. |
| SUBSCRIPTION_DENIED | 403 Forbidden | This indicates an error, other than those listed in this table, due to lack of necessary subscription to serve the UE request. |
| DNN_NOT_SUPPORTED | 403 Forbidden | The DNN is not supported by the SMF. |
| PDUTYPE_NOT_SUPPORTED | 403 Forbidden | The requested PDU session type is not supported by the SMF for the PDN corresponding to the DNN. |
| SSC_NOT_SUPPORTED | 403 Forbidden | The requested SSC mode is not supported by the SMF for the PDN corresponding to the DNN. |
| HOME_ROUTED_ROAMING_REQUIRED | 403 Forbidden | It is used in LBO roaming, if the V-SMF is not able to process some part of the N1 SM information that requires Home Routed Roaming. |
| OUT_OF_LADN_SERVICE_AREA | 403 Forbidden | The PDU session corresponds to a LADN and the UE is outside of the LADN Service Area. |
| N2_SM_ERROR | 403 Forbidden | This indicates that an error, other than those listed in this table, was detected when processing the N2 SM information received in the request, e.g. N2 SM protocol error. |
| PRIORITIZED_SERVICES_ONLY | 403 Forbidden | The SMF was notified that the UE is reachable only for regulatory prioritized service and the PDU Session to be activated is not for a regulatory prioritized service. |
| PDU_SESSION_ANCHOR_CHANGE | 403 Forbidden | The SMF decided to change the PDU Session Anchor for the PDU Session. |
| TARGET_MME_CAPABILITY | 403 Forbidden | A request to retrieve an SM context is rejected due to the target MME not capable to support the PDU session. |
| NO_EPS_5GS_CONTINUITY | 403 Forbidden | It is used during an EPS to 5GS Idle mode mobility or handover, if the PDU session does not support seamless session continuity to 5GS. |
| UNABLE_TO_PAGE_UE | 403 Forbidden | The request is rejected due to a temporarily inability to page the UE. |
| UE_NOT_RESPONDING | 403 Forbidden | The UE did not respond to the request initiated by the network, e.g. paging. |
| REJECTED_BY_UE | 403 Forbidden | The request is rejected by the UE. |
| REJECTED_DUE_VPLMN_POLICY | 403 Forbidden | The request is rejected due to VPLMN operator policy. |
| HO_TAU_IN_PROGRESS | 403 Forbidden | The request is rejected temporarily due to a mobilty procedure in progress. |
| INTEGRITY_PROTECTED_MDR_NOT_ACCEPTABLE | 403 Forbidden | The integrity protected maximum data rate value provided by the UE is not acceptable for the PDU session based on local policy at the |

| | | SMF. This error is applicable when the UP Security Policy for the PDU Session is determined to have Integrity Protection set to "Required".<br><br>An NF service consumer that receives this error cause may use it for maintaining KPIs. |
|---|---|---|
| EBI_EXHAUSTED | 403 Forbidden | The allocation of EPS Bearer ID failed due to exhaustion of EBI as the maximum number of EBIs has already been allocated to the UE. |
| EBI_REJECTED_LOCAL_POLICY | 403 Forbidden | The allocation of EPS Bearer ID was rejected due to local policy in the Serving PLMN. |
| EBI_REJECTED_NO_N26 | 403 Forbidden | The allocation of EPS Bearer ID was rejected when the AMF is in a serving PLMN that does not support 5GS-EPS interworking procedures with N26 interface. |
| DEFAULT_EPS_BEARER_INACTIVE | 403 Forbidden | It is used during EPS to 5GS mobility if the default EPS bearer context of the PDU session is reported as inactive by the UE in the epsBearerCtxStatus attribute. |
| HANDOVER_RESOURCE_ALLOCATION_FAILURE | 403 Forbidden | It is used during a N2 handover preparation or an EPS to 5GS handover preparation, if no resource is allocated by the target NG-RAN for the PDU session. |
| LATE_OVERLAPPING_REQUEST | 403 Forbidden | The request is rejected because it collides with an existing SM context or PDU session context with a more recent origination timestamp (see clause 5.2.3.3). |
| DEFAULT_EBI_NOT_TRANSFERRED | 403 Forbidden | It is used during 5GS to EPS mobility if the EBI of the default EPS bearer is included in the notToTransferEbiList attribute. |
| SERVICE_AUTHORIZATION_FAILED_NEXT_HOP | 403 Forbidden | the SMF is not allowed to access service provided by next hop NF producer, e.g. H-SMF or SMF or old I-SMF or old V-SMF. |
| CONTEXT_NOT_FOUND | 404 Not Found | It is used when no context corresponding to the request exists in the SMF. |
| HIGHER_PRIORITY_REQUEST_ONGOING | 409 Conflict | The request is rejected temporarily due to procedure for higher priority session in progress. |
| UE_IN_CM_IDLE_STATE | 409 Conflict | The request is rejected due to the UE being in CM-IDLE state for the PDU session associated to non-3GPP access. |
| INSUFFICIENT_RESOURCES_SLICE | 500 Internal Server Error | The request cannot be provided due to insufficient resources for the specific slice. |
| INSUFFICIENT_RESOURCES_SLICE_DNN | 500 Internal Server Error | The request cannot be provided due to insufficient resources for the specific slice and DNN. |
| DNN_CONGESTION | 503 Service Unavailable | The SMF has detected congestion for the requested DNN and performs overload control for that DNN which does not allow the PDU session to be established. |
| S_NSSAI_CONGESTION | 503 Service Unavailable | The SMF has detected congestion for the requested S-NSSAI and performs overload control for that S-NSSAI which does not allow the PDU session to be established. |
| PEER_NOT_RESPONDING | 504 Gateway Timeout | No response is received from a remote peer, e.g. from the H-SMF for a HR PDU session. |
| NETWORK_FAILURE | 504 Gateway Timeout | The request is rejected due to a network problem. |
| UPF_NOT_RESPONDING | 504 Gateway Timeout | The request is rejected due to no response received from the UPF. |
| UE_NOT_REACHABLE | 504 Gateway Timeout | The UE is not reachable for service. |

```
* * * Next Change * * * *
```

A.2  Nsmf_PDUSession API

```
openapi: 3.0.0 info:
  version: '1.1.0'
  title: 'Nsmf_PDUSession'
  description: |
    SMF PDU Session Service.
    © 2020, 3GPP Organizational Partners (ARIB, ATIS, CCSA, ETSI, TSDSI, TTA, TTC).
    All rights reserved.

externalDocs:
  description: 3GPP TS 29.502 V16.4.0; 5G System; Session Management Services; Stage 3
  url: http://www.3gpp.org/ftp/Specs/archive/29_series/29.502/ servers:
  - url: '{apiRoot}/nsmf-pdusession/v1'
    variables:
      apiRoot:
        default: https://example.com
        description:  apiRoot as defined in clause 4.4 of 3GPP TS 29.501. The sm-contexts and pdu-sessions
resources can be distributed on different processing instances or hosts. Thus the authority and/or
deployment-specific string of the apiRoot of the created individual sm context and pdu-session
resources' URIs may differ from the authority and/or deployment-specific string of the apiRoot of the
sm-contexts and pdu-sessions collections' URIs.

******************** Text Skipped for Clarify **************************

# STRUCTURED DATA TYPES

    SmContextCreateData:
      type: object
      properties:
        supi:
          $ref: 'TS29571_CommonData.yaml#/components/schemas/Supi'
        unauthenticatedSupi:
          type: boolean
          default: false
        pei:
          $ref: 'TS29571_CommonData.yaml#/components/schemas/Pei'
        gpsi:
          $ref: 'TS29571_CommonData.yaml#/components/schemas/Gpsi'
        pduSessionId:
          $ref: 'TS29571_CommonData.yaml#/components/schemas/PduSessionId'
        dnn:
          $ref: 'TS29571_CommonData.yaml#/components/schemas/Dnn'
        selectedDnn:
          $ref: 'TS29571_CommonData.yaml#/components/schemas/Dnn'
        sNssai:
          $ref: 'TS29571_CommonData.yaml#/components/schemas/Snssai'
        hplmnSnssai:
          $ref: 'TS29571_CommonData.yaml#/components/schemas/Snssai'
        servingNfId:
          $ref: 'TS29571_CommonData.yaml#/components/schemas/NfInstanceId'
        guami:
          $ref: 'TS29571_CommonData.yaml#/components/schemas/Guami'
        serviceName:
          $ref: 'TS29510_Nnrf_NFManagement.yaml#/components/schemas/ServiceName'
        servingNetwork:
          $ref: 'TS29571_CommonData.yaml#/components/schemas/PlmnIdNid'
        requestType:
          $ref: '#/components/schemas/RequestType'
        n1SmMsg:
          $ref: 'TS29571_CommonData.yaml#/components/schemas/RefToBinaryData'
        anType:
          $ref: 'TS29571_CommonData.yaml#/components/schemas/AccessType'
        additionalAnType:
          $ref: 'TS29571_CommonData.yaml#/components/schemas/AccessType'
        ratType:
```

```
  $ref: 'TS29571_CommonData.yaml#/components/schemas/RatType'
presenceInLadn:
  $ref: 'TS29571_CommonData.yaml#/components/schemas/PresenceState'
ueLocation:
  $ref: 'TS29571_CommonData.yaml#/components/schemas/UserLocation'
ueTimeZone:
  $ref: 'TS29571_CommonData.yaml#/components/schemas/TimeZone'
addUeLocation:
  $ref: 'TS29571_CommonData.yaml#/components/schemas/UserLocation'
smContextStatusUri:
  $ref: 'TS29571_CommonData.yaml#/components/schemas/Uri'
hSmfUri:
  $ref: 'TS29571_CommonData.yaml#/components/schemas/Uri'
hSmfId:
  $ref: 'TS29571_CommonData.yaml#/components/schemas/NfInstanceId'
smfUri:
  $ref: 'TS29571_CommonData.yaml#/components/schemas/Uri'
smfId:
  $ref: 'TS29571_CommonData.yaml#/components/schemas/NfInstanceId'
additionalHsmfUri:
  type: array
  items:
    $ref: 'TS29571_CommonData.yaml#/components/schemas/Uri'
  minItems: 1
additionalHsmfId:
  type: array
  items:
    $ref: 'TS29571_CommonData.yaml#/components/schemas/NfInstanceId'
  minItems: 1
additionalSmfUri:
  type: array
  items:
    $ref: 'TS29571_CommonData.yaml#/components/schemas/Uri'
  minItems: 1
additionalSmfId:
  type: array
  items:
    $ref: 'TS29571_CommonData.yaml#/components/schemas/NfInstanceId'
  minItems: 1
oldPduSessionId:
  $ref: 'TS29571_CommonData.yaml#/components/schemas/PduSessionId'
pduSessionsActivateList:
  type: array
  items:
    $ref: 'TS29571_CommonData.yaml#/components/schemas/PduSessionId'
  minItems: 1
ueEpsPdnConnection:
  $ref: '#/components/schemas/EpsPdnCnxContainer'
hoState:
  $ref: '#/components/schemas/HoState'
pcfId:
  $ref: 'TS29571_CommonData.yaml#/components/schemas/NfInstanceId'
pcfGroupId:
  $ref: 'TS29571_CommonData.yaml#/components/schemas/NfGroupId'
pcfSetId:
  $ref: 'TS29571_CommonData.yaml#/components/schemas/NfSetId'
nrfUri:
  $ref: 'TS29571_CommonData.yaml#/components/schemas/Uri'
supportedFeatures:
  $ref: 'TS29571_CommonData.yaml#/components/schemas/SupportedFeatures'
selMode:
  $ref: '#/components/schemas/DnnSelectionMode'
backupAmfInfo:
  type: array
  items:
    $ref: 'TS29571_CommonData.yaml#/components/schemas/BackupAmfInfo'
  minItems: 1
traceData:
  $ref: 'TS29571_CommonData.yaml#/components/schemas/TraceData'
udmGroupId:
  $ref: 'TS29571_CommonData.yaml#/components/schemas/NfGroupId'
routingIndicator:
  type: string
epsInterworkingInd:
  $ref: '#/components/schemas/EpsInterworkingIndication'
indirectForwardingFlag:
  type: boolean
directForwardingFlag:
  type: boolean
targetId:
```

```
      $ref: 'TS29518_Namf_Communication.yaml#/components/schemas/NgRanTargetId'
    epsBearerCtxStatus:
      $ref: '#/components/schemas/EpsBearerContextStatus'
    cpCiotEnabled:
      type: boolean
      default: false
    cpOnlyInd:
      type: boolean
      default: false
    invokeNef:
      type: boolean
      default: false
    maRequestInd:
      type: boolean
      default: false
    maNwUpgradeInd:
      type: boolean
      default: false
    n2SmInfo:
      $ref: 'TS29571_CommonData.yaml#/components/schemas/RefToBinaryData'
    n2SmInfoType:
      $ref: '#/components/schemas/N2SmInfoType'
    n2SmInfoExt1:
      $ref: 'TS29571_CommonData.yaml#/components/schemas/RefToBinaryData'
    n2SmInfoTypeExt1:
      $ref: '#/components/schemas/N2SmInfoType'
    smContextRef:
      $ref: 'TS29571_CommonData.yaml#/components/schemas/Uri'
    smContextSmfId:
      $ref: 'TS29571_CommonData.yaml#/components/schemas/NfInstanceId'
    upCnxState:
      $ref: '#/components/schemas/UpCnxState'
    smallDataRateStatus:
      $ref: 'TS29571_CommonData.yaml#/components/schemas/SmallDataRateStatus'
    apnRateStatus:
      $ref: 'TS29571_CommonData.yaml#/components/schemas/ApnRateStatus'
    extendedNasSmTimerInd:
      type: boolean
      default: false
    dlDataWaitingInd:
      type: boolean
      default: false
    ddnFailureSubs:
      $ref: '#/components/schemas/DdnFailureSubs'
    smfTransferInd:
      type: boolean
      default: false
    oldSmfId:
      $ref: 'TS29571_CommonData.yaml#/components/schemas/NfInstanceId'
    oldSmContextRef:
      $ref: 'TS29571_CommonData.yaml#/components/schemas/Uri'
    wAgfInfo:
      $ref: 'TS29510_Nnrf_NFManagement.yaml#/components/schemas/WAgfInfo'
    tngfInfo:
      $ref: 'TS29510_Nnrf_NFManagement.yaml#/components/schemas/TngfInfo'
    twifInfo:
      $ref: 'TS29510_Nnrf_NFManagement.yaml#/components/schemas/TwifInfo'
  required:
    - servingNfId
    - servingNetwork
      anType
    - smContextStatusUri
```

**\*\*\*\*\*\*\*\*\*\*\*\*\*\*\*\*\*\*\*\* Text Skipped for Clarify \*\*\*\*\*\*\*\*\*\*\*\*\*\*\*\*\*\*\*\*\*\*\*\*\***

**\* \* \* End of Changes \* \* \* \***

The various blocks/steps shown in FIGS. 5-12 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

In an embodiment, SMF IDs corresponding to SMF Service URIs and SM context URI may be added in SmContextCreateData data type.

In an embodiment, it defines a new application Error for Service Authorization failure when V-SMF/I-SMF not authorized to access service on H-SMF/SMF/old V-/I-SMF.

In an embodiment, it can update a service procedure for AMF to provide corresponding SMF ID(s).

Embodiments herein afford many advantages, of which a non-exhaustive list of examples follows. Some embodiments herein may allow the first session management function to get the access token (such as OAuth2 Token) for the second session management function based on the access and mobility management function (such as AMF) provided NF instance ID, so that the first session management function can be authorized to perform various options (such as SM Context retrieve operation or PDU session create operation) on the second session management function. The embodiments herein are not limited to the features and advantages mentioned above. A person skilled in the art will recognize additional features and advantages upon reading the following detailed description.

Figure 13:
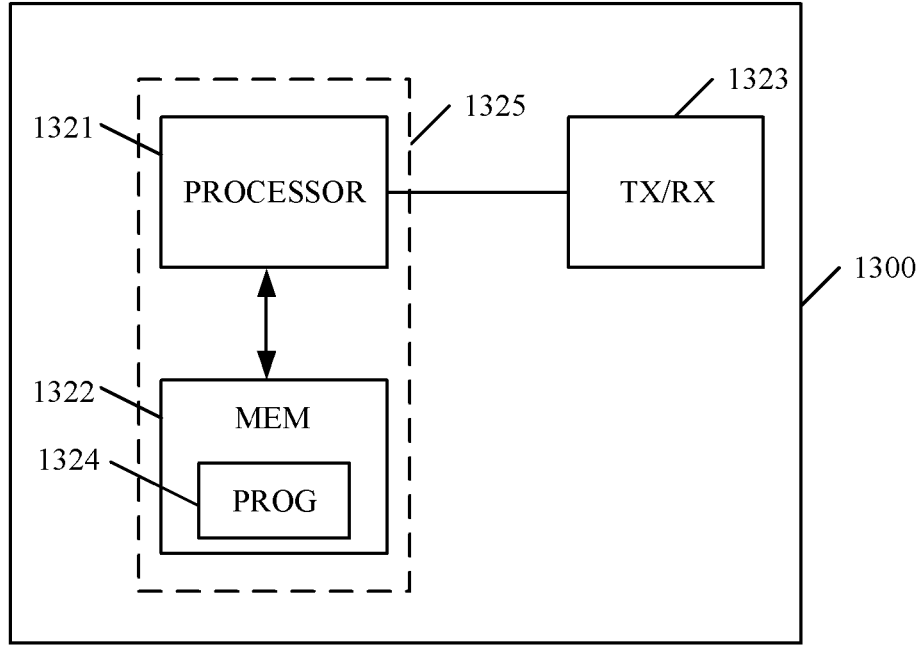
FIG. 13 is a block diagram showing an apparatus suitable for practicing some embodiments of the disclosure.

FIG. 13 is a block diagram showing an apparatus suitable for practicing some embodiments of the disclosure. For example, any one of the first session management function, the network repository function, the second session management function and the network function service consumer described above may be implemented as or through the apparatus 1300.

The apparatus 1300 comprises at least one processor 1321, such as a digital processor (DP), and at least one memory (MEM) 1322 coupled to the processor 1321. The apparatus 1320 may further comprise a transmitter TX and receiver RX 1323 coupled to the processor 1321. The MEM 1322 stores a program (PROG) 1324. The PROG 1324 may include instructions that, when executed on the associated processor 1321, enable the apparatus 1320 to operate in accordance with the embodiments of the present disclosure. A combination of the at least one processor 1321 and the at least one MEM 1322 may form processing means 1325 adapted to implement various embodiments of the present disclosure.

Various embodiments of the present disclosure may be implemented by computer program executable by one or more of the processor 1321, software, firmware, hardware or in a combination thereof.

The MEM 1322 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1321 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the first session management function, the memory 1322 contains instructions executable by the processor 1321, whereby the first session management function operates according to any step of any of the methods related to the first session management function as described above.

In an embodiment where the apparatus is implemented as or at the network repository function, the memory 1322 contains instructions executable by the processor 1321, whereby the network repository function operates according to any step of the methods related to the network repository function as described above.

In an embodiment where the apparatus is implemented as or at the second session management function, the memory 1322 contains instructions executable by the processor 1321, whereby the second session management function operates according to any step of the methods related to the second session management function as described above.

In an embodiment where the apparatus is implemented as or at the network function service consumer, the memory 1322 contains instructions executable by the processor 1321, whereby the network function service consumer operates according to any step of the methods related to the network function service consumer as described above.

Figure 14:
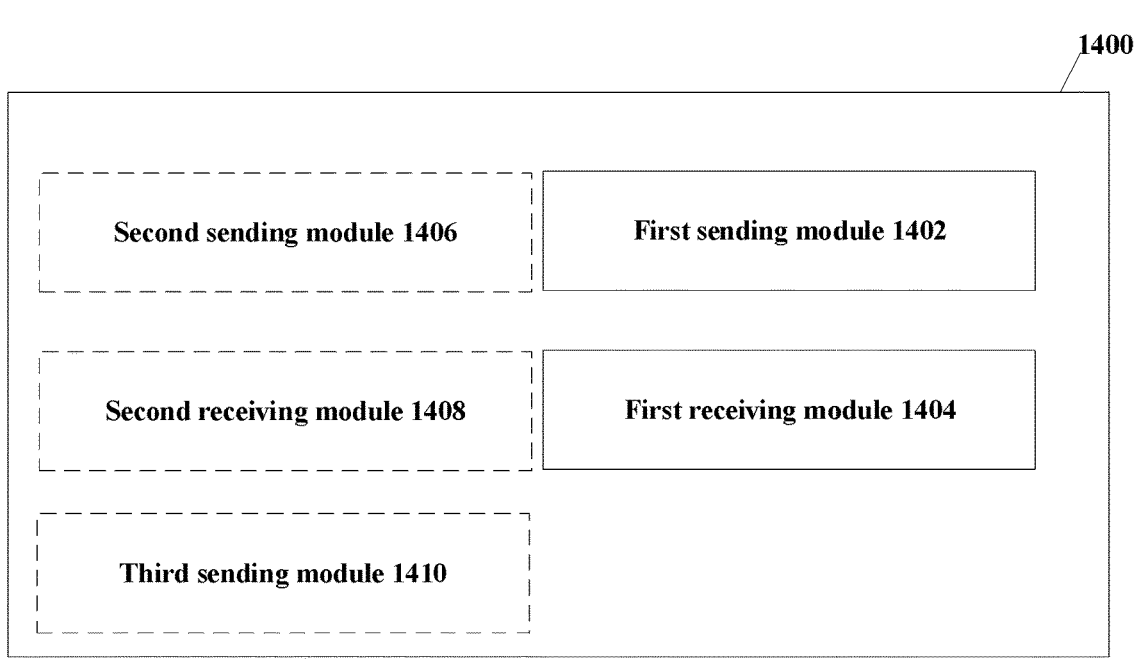
FIG. 14 is a block diagram showing a first session management function according to an embodiment of the disclosure.

FIG. 14 is a block diagram showing a first session management function according to an embodiment of the disclosure. As shown, the first session management function 1400 comprises a first sending module 1402 and a first receiving module 1404. The first sending module 1402 may be configured to send a first request for getting an access token for a second session management function to a network repository function. The first receiving module 1404 may be configured to receive a first response containing the access token for the second session management function or error information from the network repository function.

In an embodiment, the first session management function 1400 may further comprise a second sending module 1406. The second sending module 1406 may be configured to send a second request containing the access token for the second session management function to the second session management function. In an embodiment, the first session management function 1400 may further comprise a second receiving module 1408. The second receiving module 1408 may be configured to receive a third request containing a network function instance identifier of the second session management function from a network function service consumer.

In an embodiment, the first session management function may further comprise a third sending module 1410. The third sending module 1410 may be configured to send a third response comprising an application error indicating that the first session management function is not authorized to access service provided by the second session management function to the network function service consumer.

Figure 15:
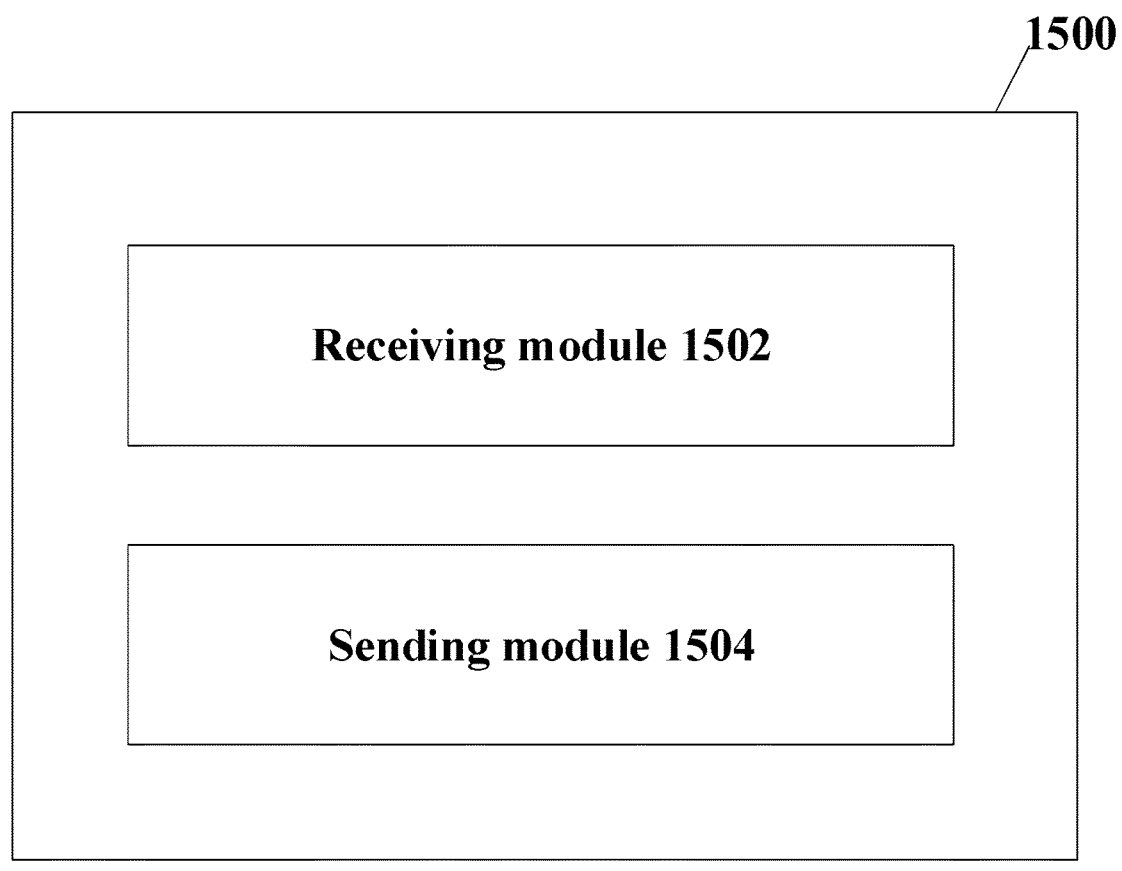
FIG. 15 is a block diagram showing a network repository function according to an embodiment of the disclosure.

FIG. 15 is a block diagram showing a network repository function according to an embodiment of the disclosure. As shown, the network repository function 1500 comprises a receiving module 1502 and a sending module 1504. The receiving module 1502 may be configured to receive a first request for getting an access token for a second session management function from a first session management function. The sending module 1504 may be configured to send a first response containing the access token for the second session management function or error information to the first session management function.

Figure 16:
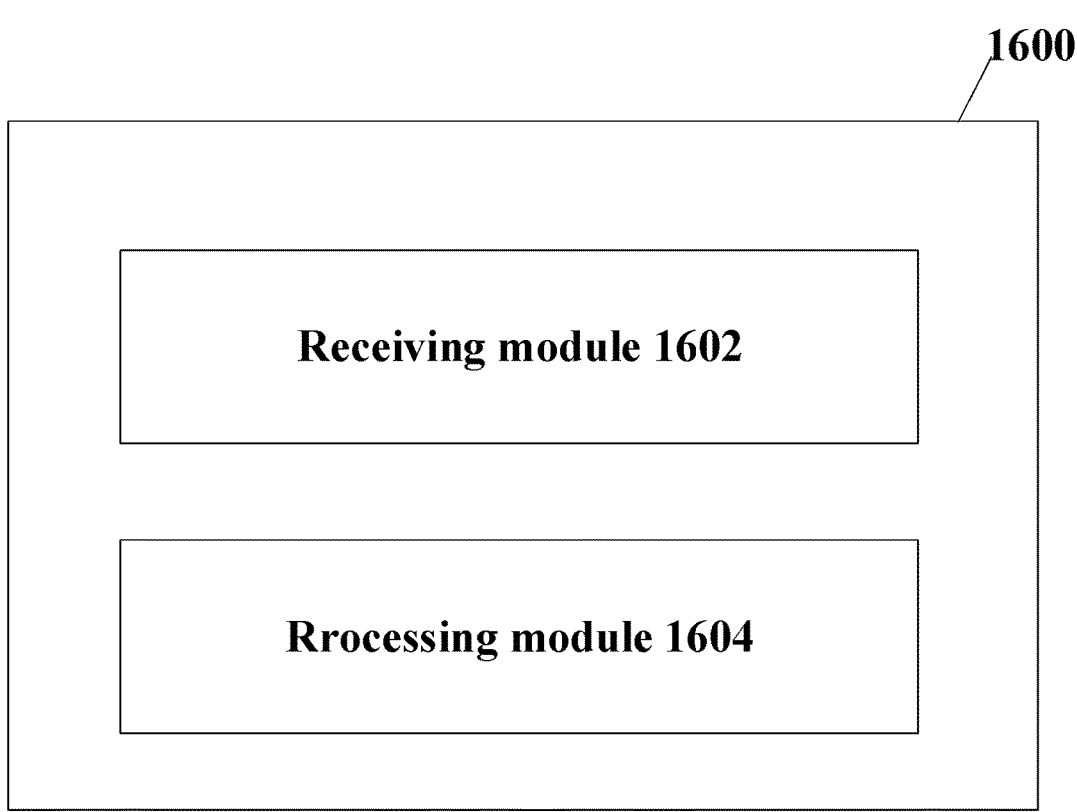
FIG. 16 is a block diagram showing a second session management function according to an embodiment of the disclosure.

FIG. 16 is a block diagram showing a second session management function according to an embodiment of the disclosure. As shown, the second session management function 1600 comprises a receiving module 1602 and a processing module 1604. The receiving module 1602 may be configured to receive a second request containing an access token for the second session management function from a first session management function. The processing module 1604 may be configured to process the second request.

Figure 17:
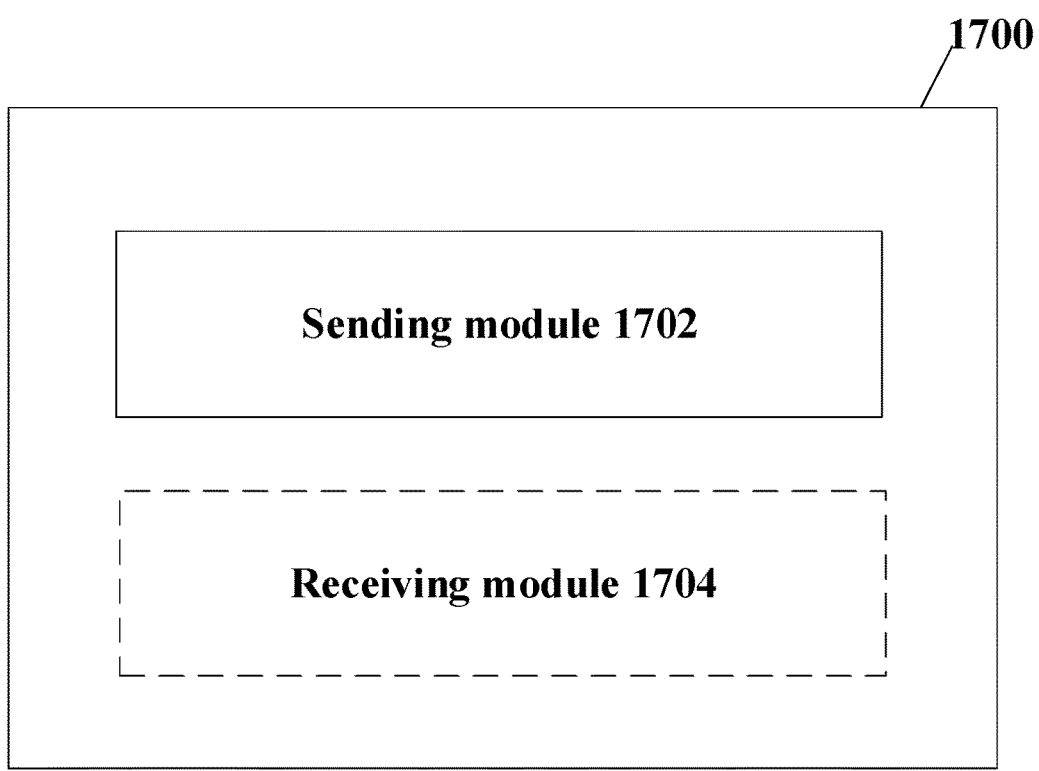
FIG. 17 is a block diagram showing a network function service consumer according to an embodiment of the disclosure.

FIG. 17 is a block diagram showing a network function service consumer according to an embodiment of the disclosure. As shown, the network function service consumer 1700 comprises a sending module 1702. The sending module 1702 may be configured to send a third request containing a network function instance identifier of a second session management function to a first session management function.

In an embodiment, the network function service consumer may further comprise a receiving module 1704. The receiving module may be configured to receive a third response comprising an application error indicating that the first session management function is not authorized to access service provided by the second session management function from the first session management function.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the first session management function, the network repository function, the second session management function or the network function service consumer may not need a fixed processor or memory, any computing resource and storage resource may be arranged from the first session management function, the network repository function, the second session management function or the network function service consumer in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform one or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a first session management function, comprising:

receiving a third request containing a network function instance identifier of a second session management function from an Access and Mobility Management Function, AMF;

sending a first request for getting an access token for the second session management function to a network repository function, wherein the first request includes the network function instance identifier of the second session management function; and receiving a first response containing the access token for the second session management function or error information from the network repository function.

2. The method according to claim 1, further comprising:

sending a second request containing the access token for the second session management function to the second session management function.

3. The method according to claim 2, wherein the second request comprises at least one of:

a request for establishing a forwarding tunnel between the first session management function and the second session management function;

a request for retrieving session management context from the second session management function;

a request for creating a new protocol data unit (PDU) session in the second session management function or creating an association with an existing packet data network (PDN) connection in the second session management function;

a request for updating an established PDU session in the second session management function;

a request for releasing resources associated with a PDU session in the second session management function; or a request for pushing session management context to the second session management function.

4. The method according to claim 3, wherein the second request comprises at least one of:

an Nsmf_PDUSession_UpdateSMContext Request;
an Nsmf_PDUSession_Context Request;
an Nsmf_PDUSession_Create Request;
an Nsmf_PDUSession_Update;
an Nsmf_PDUSession_Release Request; or
an Nsmf_PDUSession_ContextPushRequest.

5. The method according to claim 1, wherein the first request is an Nnrf_AccessToken_Get request.

6. The method according to claim 1, wherein the network function instance identifier of the second session management function comprises at least one of:

the network function instance identifier of a session management function hosting session management (SM) Context;

the network function instance identifier of a home session management function;

the network function instance identifier of a session management function;

at least one network function instance identifier of at least one additional home session management function; or at least one network function instance identifier of at least one additional session management function.

7. The method according to claim 1, wherein the error information indicates that the first session management function is not allowed to access a service provided by a next hop network function producer.

8. The method according to claim 1, wherein the second session management function is a home session management function or a session management function or an old intermediate session management function or an old visited session management function.

9. The method according to claim 1, wherein the first session management function is a new intermediate session management function or a visited session management function.

10. The method according to claim 1, wherein the network repository function is an OAuth 2.0 authorization server, the first session management function is an OAuth 2.0 client and the second session management function is an OAuth 2.0 resource server.

11. The method according to claim 1, further comprising:

sending a third response comprising an application error indicating that the first session management function is not authorized to access service provided by the second session management function to the network function service consumer.

12. The method according to claim 1, wherein the first request is sent to the network repository function when OAuth is enabled for the second session management function.

13. A first session management function, comprising:

a processor; and a memory coupled to the processor, said memory containing instructions executable by said processor, whereby said first session management function is operative to:

receive a third request containing a network function instance identifier of a second session management function from an Access and Mobility Management Function, AMF;

send a first request for getting an access token for the second session management function to a network repository function, wherein the first request includes the network function instance identifier of the second session management function; and receive a first response containing the access token for the second session management function or error information from the network repository function.

* * * * *